(12) United States Patent
Kurita et al.

(10) Patent No.: US 6,529,704 B1
(45) Date of Patent: Mar. 4, 2003

(54) IMAGE FORMING METHOD, IMAGE FORMING APPARATUS, TONER REMOVING DEVICE AND IMAGE RECEIVING SHEET

(75) Inventors: Takaji Kurita, Osakasayama (JP); Hiroshi Mizuno, Ikoma (JP); Masahiko Matsuura, Suita (JP); Hidetoshi Miyamoto, Takatsuki (JP); Keyaki Yogome, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/660,203

(22) Filed: Sep. 12, 2000

(30) Foreign Application Priority Data

Oct. 1, 1999 (JP) ............................................ 11-281812

(51) Int. Cl.[7] ........................ G03G 15/00; G03G 15/22
(52) U.S. Cl. ...................................... 399/390; 399/130
(58) Field of Search ............................ 399/1, 127, 130, 399/390, 411; 430/97; 428/167, 188

(56) References Cited

U.S. PATENT DOCUMENTS

| 5,353,108 A | * 10/1994 | Tsukamoto | ................ 399/390 |
| 5,545,381 A | * 8/1996 | Iida et al. | ................... 399/1 X |
| 5,678,158 A | * 10/1997 | Kurotori et al. | ............ 399/390 |
| 5,781,822 A | * 7/1998 | Nishiyama et al. | ............ 399/1 |
| 5,970,272 A | * 10/1999 | Kobayashi et al. | ............ 399/1 |
| 6,150,066 A | * 11/2000 | Kurotori et al. | ............... 430/97 |
| 6,236,831 B1 | * 5/2001 | Mei et al. | ................... 399/411 |

FOREIGN PATENT DOCUMENTS

| JP | 05-289575 | * 11/1993 |
| JP | 6-43682 | 2/1994 |
| JP | 06-051670 | * 2/1994 |
| JP | 11-56416 | 9/2000 |
| JP | 2000-250249 | 9/2000 |
| JP | 2000-352908 | 12/2000 |

* cited by examiner

Primary Examiner—Sandra Brase
(74) Attorney, Agent, or Firm—Morrison & Foerster LLP

(57) ABSTRACT

A toner is formed on an image receiving sheet S. The image receiving sheet S has an irregular surface s2' provided with continuous groove-like concavities R for accommodating toner. The toner T is removably adhered to the concavities R of the image receiving sheet irregular surface s2' for forming the toner image. Ridges P extending along the continuous groove-like concavities R protect the toner T adhered to the concavities R. The toner image formation surface may be covered with a peelable protective sheet CF (CF'). When the image receiving sheet S carrying the toner image is to be reused, the toner is separated and removed from the image receiving sheet, and the image receiving sheet and/or the toner after removal of the toner are reused.

28 Claims, 14 Drawing Sheets

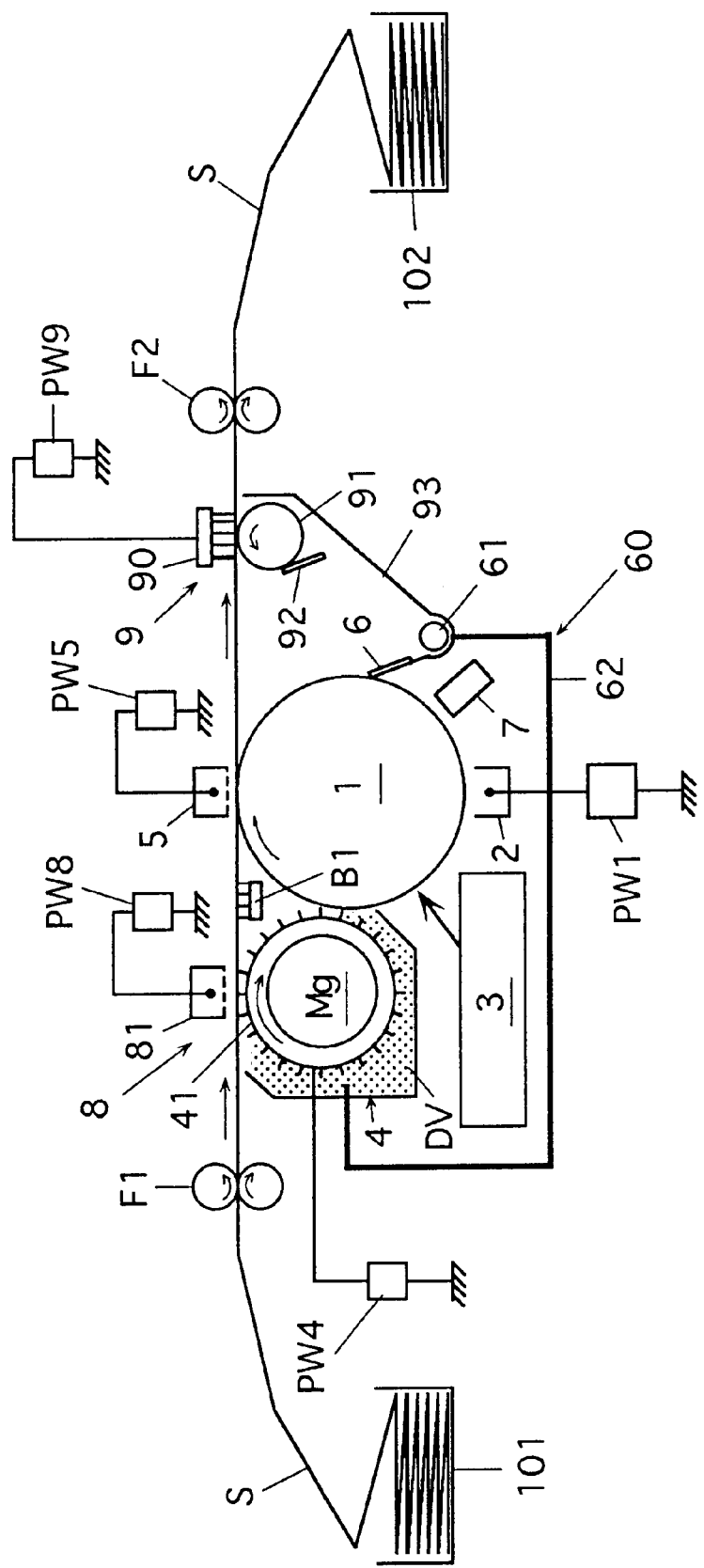

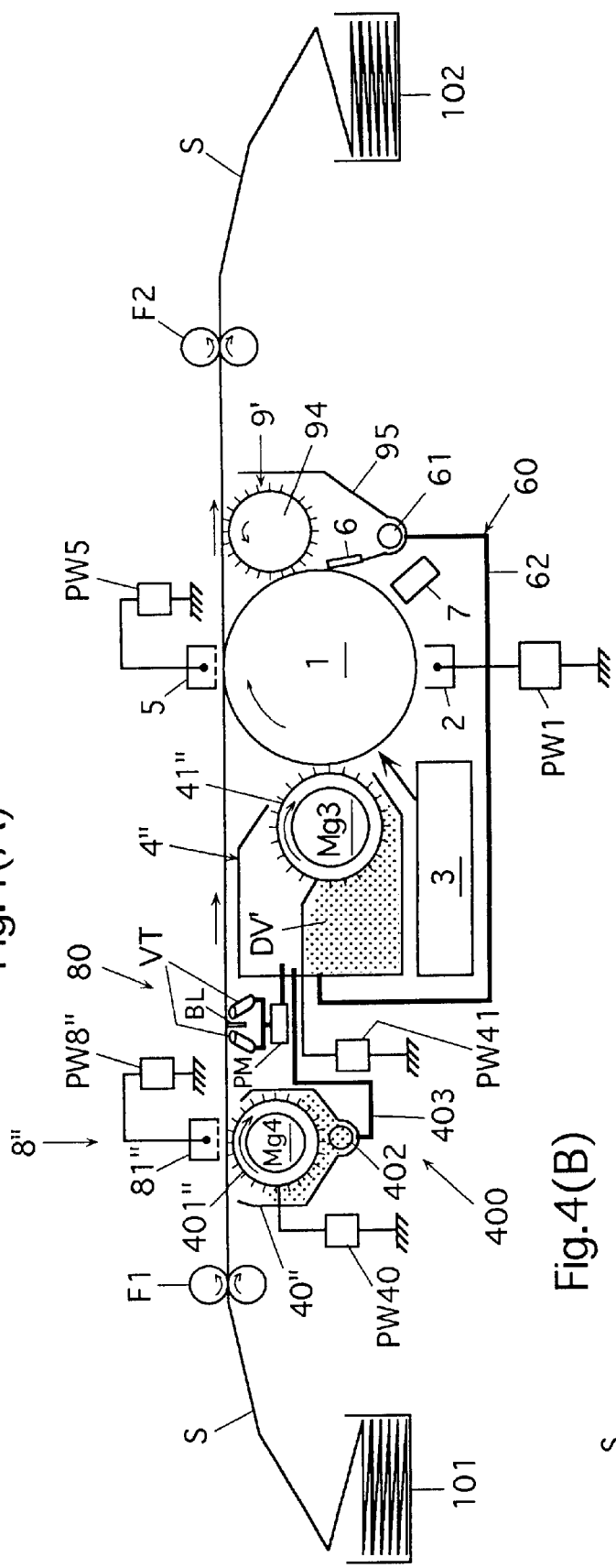
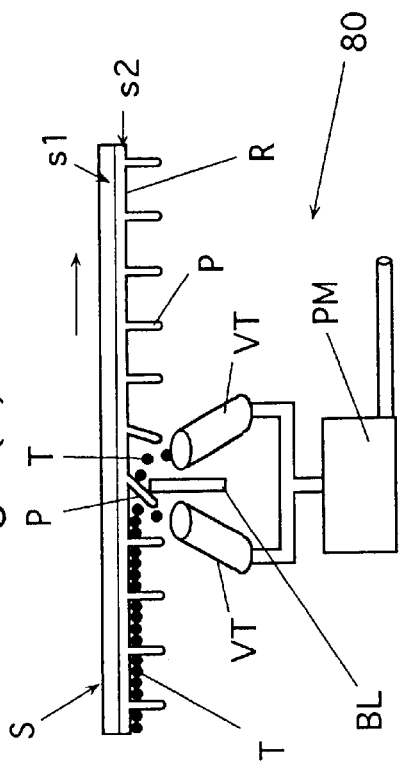
Fig.4(A)
Fig.4(B)

IMAGE FORMING METHOD, IMAGE FORMING APPARATUS, TONER REMOVING DEVICE AND IMAGE RECEIVING SHEET

The invention is based on patent application No. 11-281812 Pat. filed in Japan, the contents of which are hereby incorporated by reference.

BACKGROUND OF THE INVENTION

1. Field of the Invention

The present invention relates to an image forming method of a non-fixing type for forming a toner image on an image receiving sheet as well as a method of reusing an image formation material (an image receiving sheet, toner and/or the like), and also relates to an image forming apparatus and an image receiving sheet which are used for the above methods.

2. Description of the Background Art

Various image forming methods have been employed for forming toner images on image receiving sheets. An electrophotographic image forming method is a typical one among these methods.

According to the electrophotographic image formation, an electrostatic latent image carrier such as a photosensitive member is charged to a predetermined potential, and image exposure is effected on the charged region to form an electrostatic latent image according to original image information. Then, the electrostatic latent image thus formed is developed into a visible toner image with developer. The visible toner image is finally transferred onto the image receiving sheet, and is fixed thereto.

Apart from the above, the image forming method of a direct recording type has been proposed. According to this type, the electrostatic latent image is not formed, and the toner is directly adhered onto the image receiving sheet to form the toner image in accordance with the original image information, and is fixed. Alternatively, the toner image may be directly formed on an intermediate transfer member in a similar manner. The image thus formed is then transferred and fixed onto the image receiving sheet.

In either of the above types, the conventional image forming method uses the toner which can be fixed onto the image receiving sheet. As a typical example of such developer, toner of a hot-melting type, which is formed of pigment or dye dispersed and mixed into thermoplastic resin, may be used.

The toner image formed of the toner of such a hot-melting type is finally melted by the heat applied from a heat roller, infrared ray irradiating device, or the like, and is fixed onto the image receiving sheet made of paper, plastics or the like. If necessary, a pressure is applied during the heating.

The toner fixed onto the image receiving sheet cannot be separated from the image receiving sheet without difficulty, and therefore reuse of the toner and image receiving sheet is difficult. Accordingly, the image receiving sheet having the toner image fixed thereto will be disposed when it becomes unnecessary.

According to progress of the information technology in recent days, large amounts of toner and image receiving sheets have been used, and the energy required for the production of them as well as a carbon dioxide gas discharged thereby have been increasing.

As a method of separating the toner from the transfer sheet(image receiving sheet) for reusing transfer sheets carrying toner images fixed thereto, a deinking method which uses an aqueous solution of, e.g., a surface active agent has been know. However, this requires a large amount of energy for removing water permeated into paper, and the removed toner cannot be reused because it is in the solidified form after melting.

For overcoming the above problems, another manner is already proposed for reusing the image receiving sheet and the toner. In this manner, minute projections are formed and dispersed on a surface of the image receiving sheet. The toner image is transferred onto the irregular surface of the image receiving sheet, and is fixed by a pressure for forming the image. The toner forming the image is separated from the image receiving sheet in a mechanical manner for reusing the image receiving sheet and the toner.

According to the above image forming method and the image receiving sheet, however, the image receiving sheet is handled after the image formation while keeping the toner adhered onto the minute projections on the image receiving sheet. Although the toner adhered to the projections is fixed thereto by the pressing processing after the transfer of the toner image onto the image receiving sheet, the toner must be fixed to the projections only to an extent which allows mechanical removable of the toner from the image receiving sheet in a later processing. Accordingly, when the sheet carrying the image comes into contact with a finger or the like, or is laid over another image receiving sheet or the like, the toner on the projections may adhere onto the finger, the rear surface of the sheet or the like, and thereby smear them.

Since each of the minute projections formed on the image receiving sheet has an independent point-like form, and therefore is liable to be bent or deformed by an external force. Further, projected portions, which are present on an object in contact with the image receiving sheet, are liable to be located between the projections of the image receiving sheet. This disturbs the toner image, and thus prevents sufficient protection of the toner image.

Accordingly, the image forming method and the image receiving sheet described above cannot be practically used without difficulty.

SUMMARY OF THE INVENTION

Accordingly, an object of the invention is to provide an image forming method for forming a toner image on an image receiving sheet, and particularly the image forming method of a non-fixing type, in which the toner image is not fixed to the image receiving sheet in contrast to the prior art, the toner image is held for image formation on the image receiving sheet in such a state that allows separation and removal, and thereby allows reuse of the toner removed from the image receiving sheet already subjected to the toner image formation and/or the image receiving sheet.

Another object of the invention is to provide a non-fixing image forming method which can be practically used, and more particularly, the non-fixing image forming method, which can form a toner image in such a manner that the toner image is protected and smearing of a finger or the like in contact with the image receiving sheet is suppressed during ordinary handling of the image receiving sheets (e.g., when viewing the image formed on the sheet, and/or overlaying the sheets for arrangement or the like after the image formation).

Still another object of the invention is to provide a method of reusing an image formation material, which allows separation and removal of toner from an image receiving sheet carrying a toner image, and allows reuse of at least one of the image formation materials such as toner and image receiving sheet.

Yet another object of the invention is to provide an image forming apparatus of a non-fixing type, which can be practically used for the image forming method and the image formation material reusing method according to the invention.

Further another object of the invention is to provide a toner removing device for separating and removing toner from an image receiving sheet, on which a toner image is formed by the image forming method according to the invention.

A further object of the invention is to provide an image receiving sheet, which is suitable to the image forming method and the image formation material reusing method according to the invention.

For achieving the above objects, the inventors have made a study to find the following facts.

(1) For forming a toner image, such an image receiving sheet may have an irregular surface provided with a large number of concavities for receiving or accommodating toner, and the toner may be removably adhered to the concavities of the irregular surface of the image receiving sheet.

(2) The toner adhered to the concavities of the irregular surface of the image receiving sheet may be protected from an external force by convexities of the irregular surface. These concavities may have continuous groove-like forms so that continuous convexities or ridges extending along the continuous groove-like concavities may protect the toner. Thereby, the toner in the concavities can be sufficiently protected during ordinary handling of the image receiving sheet carrying the image, and the toner image, which is not subjected to a conventional fixing, can be maintained as long as a particular toner removing action is not effected thereto.

(3) The toner adhered to tops of the ridges of the irregular surface of the image receiving sheet can be intensively removed after the toner is adhered to the concavities of the irregular surface of the image receiving sheet.

(4) After the toner image was formed on the image receiving sheet, the image receiving sheet and/or the like can be reused by separating and removing the toner from the image receiving sheet. This can be easily performed because the toner is removably adhered to the sheet.

(5) The image receiving sheet may be covered with a protective sheet for further reliably protecting the toner image, and for further reliably suppressing smearing of a hand or finger with toner on the image receiving sheet.

Based on the above findings, the invention provides an image forming method which allows reusing of an image formation material, and also provides an image forming apparatus, a toner removing device and an image receiving sheet used for implementing the above method. These are as follows:

(1) Image Forming Method

An image forming method including the steps of:

supplying to a printing device an image receiving sheet having an irregular surface provided with a large number of continuous groove-like concavities for receiving toner; and adhering removably a toner image corresponding to an original image to the continuous groove-like concavities of the image receiving sheet by the printing device.

(2) Image Forming Apparatus (a) An image forming apparatus including:

a device for supplying an image receiving sheet having an irregular surface provided with a large number of continuous groove-like concavities for receiving toner; and a printing device for removably adhering a toner image corresponding to an original image to the continuous groove-like concavities of the image receiving sheet supplied from the image receiving sheet supply device.

(b) An image forming apparatus including:

a device for supplying an image receiving sheet having an irregular surface provided with a large number of continuous groove-like concavities for receiving toner;

a toner separating device for separating and removing the toner from the image receiving sheet supplied from the image receiving sheet supply device; and a printing device for removably adhering a toner image corresponding to an original image to the continuous groove-like concavities of the image receiving sheet supplied through the toner separating device.

(3) Toner Removing Device

A toner removing device including:

a device for supplying an image receiving sheet having an irregular surface provided with a large number of continuous groove-like concavities for receiving toner; and a toner separating device for separating and removing the toner from the image receiving sheet supplied from the image receiving sheet supply device.

(4) Image Receiving Sheet

An image receiving sheet for forming a toner image by removably adhering toner, having an irregular surface provided with a large number of continuous groove-like concavities for receiving the toner, wherein the toner image can be formed by removably adhering the toner to the continuous groove-like concavities, and ridges extending along the continuous groove-like concavities can protect the toner adhered to the continuous groove-like concavities.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a schematic structure of an example of an image forming apparatus for implementing a non-fixing image forming method and an image formation material reusing method according to the invention;

FIG. 4A shows a schematic structure of further another example of the image forming apparatus for implementing the non-fixing image forming method and the image formation material reusing method according to the invention, and FIG. 4B shows, on an enlarged scale, a toner separating portion utilizing air suction;

Figure 2A:
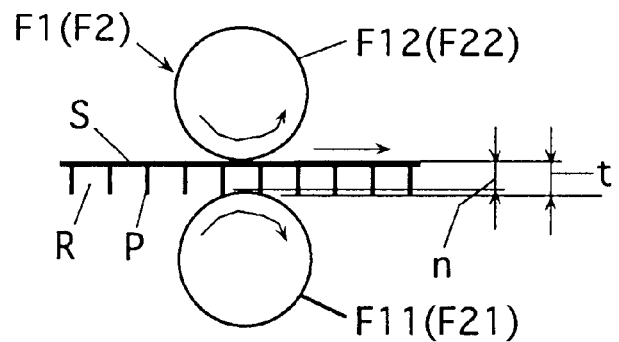
FIG. 2(A) shows a nip distance of a sheet feed roller pair.

DESCRIPTION OF THE PREFERRED EMBODIMENTS (1) Image Forming Method

An image forming method including the steps of:

supplying to a printing device an image receiving sheet having an irregular surface provided with a large number of continuous groove-like concavities for receiving toner; and adhering removably a toner image corresponding to an original image to the continuous groove-like concavities of the image receiving sheet by the printing device.

According to the image forming method described above, the image receiving sheet having the irregular surface, which is provided with the many continuous groove-like concavities for receiving the toner, is used as the sheet for image formation, and the toner is removably adhered to the continuous groove-like concavities of the irregular surface of the image receiving sheet for forming the toner image. The toner which is adhered to the continuous groove-like concavities is protected by the ridges extending along the continuous groove-like concavities.

Accordingly, the toner image thus formed is sufficiently protected by the ridges in spite of the fact that the toner image is merely adhered to the image receiving sheet, and is not subjected to fixing, e.g., by heating which is performed in a conventional image forming method. This is because the ridges extend along the continuous groove-like concavities, and thereby have a resistance against deformation such as bending. Further, even if the ridges are deformed, e.g., into an inclined form by an external force, the ridges thus deformed can cover the toner in the concavities because they extend along the groove. Therefore, the toner in the continuous groove-like concavities can be sufficiently protected, and the required state of the toner image can be maintained, unless an especially large external force or toner removing action is applied thereto. A relatively small external force may be applied to the toner image when two or more image receiving sheets come into contact with each other, and/or when the image receiving sheet is touched with a hand or finger. These contact and/or touch occur when one views the toner image on the image receiving sheet, stores the image receiving sheets or merely moving the image receiving sheets. However, such a relatively small external force does not cause disadvantages such as remarkable disturbance of the toner image and/or adhesion of the toner onto the rear side surface of the upper image receiving sheet.

Further, the toner adhered onto the image receiving sheet is removable, and therefore can be separated from the image receiving sheet. Since the toner forming the toner image adheres to the continuous groove-like concavities, it can be easily and sufficiently removed, e.g., by sweeping out the toner along the groove-like concavities with a mechanical device such as a brush device. The toner thus separated and removed can be reused, and/or the image receiving sheet from which the toner is removed can also be reused.

The image forming method described above does not require toner which can be, for example, thermally meltable and thus allows thermal fixing, although it can use the toner allowing the fixing. Accordingly, the toner made of hard material can be used so that the deformation, wearing and melting of the toner can be suppressed, and the lifetime thereof can be increased.

For forming the toner image on the image receiving sheet, this image forming method can employ a conventional manner such as an electrophotographic manner utilizing an electrostatic latent image or a direct recording manner already described.

In any one of the foregoing cases, the toner may be chargeable toner (i.e., chargeable non-magnetic toner or chargeable magnetic toner), and formation of the toner image on the image receiving sheet can be performed by electrostatically adhering the toner to the continuous groove-like concavities of the irregular surface of the image receiving sheet.

If the chargeable toner is used, an electrostatic force can be utilized for separating and removing the toner from the image receiving sheet for the purpose of reusing the sheet and/or the like. If the chargeable magnetic toner is used, the electrostatic and magnetic forces can be utilized for easily and reliably separating and removing the toner from the image receiving sheet.

When the toner image is formed on the image receiving sheet, the toner may also adhere to top portions of the ridges of the irregular surface of the image receiving sheet. However, such toner can be removed from the tops without difficulty, if necessary.

If the chargeable toner is used, the ridges of the irregular surface of the image receiving sheet may be charged to have the same polarity as the toner so that the toner adhered onto the top portions of the ridges can be easily separated and removed.

The toner which adhered onto the top portions of the ridges of the irregular surface of the image receiving sheet in the toner image forming operation can be removed by a ridge cleaning rotary member, which carries local electrostatic fields and/or local magnetostatic fields dispersed in a fine pattern on the surface, and can be located into contact with or close to the ridges for attracting and removing the toner on the ridges to the cleaning rotary member.

If the above ridge cleaning rotary member is employed, the ridge cleaning rotary member carrying the local electrostatic fields and/or local magnetostatic fields dispersed in the fine pattern on the surface is located in contact with or close to the ridges for attracting and removing the toner, which is adhered onto the ridges, onto the cleaning rotary member. This operation is performed depending on whether the toner is the chargeable type or chargeable magnetic type.

For example, the toner may be the chargeable toner, and the toner image is formed on the image receiving sheet by electrostatically adhering the toner to the continuous groove-like concavities of the irregular surface of the image receiving sheet. In this case, the ridge cleaning rotary member may be configured to form on its surface the local electrostatic fields, of which polarity is opposite to the chargeable polarity of the toner adhered to the ridges of the irregular surface of the image receiving sheet, in the fine pattern.

Further, the toner may be the chargeable magnetic toner, and the toner image is formed on the image receiving sheet by electrostatically adhering the toner to the continuous groove-like concavities of the irregular surface of the image receiving sheet. In this case, the ridge cleaning rotary member may be configured to form on its surface the local electrostatic fields and the local magnetostatic fields in the fine pattern.

Even in the case where the chargeable magnetic toner is used, the ridge cleaning rotary member may be configured to form on its surface the local electrostatic fields, of which polarity is opposite to the chargeable polarity of the toner adhered to the ridges of the irregular surface of the image receiving sheet, in the fine pattern. It is possible to use the ridge cleaning rotary member carrying on its surface both the local electrostatic fields in the fine pattern and the local magnetostatic fields in the fine pattern. It is also possible to use both the ridge cleaning rotary member carrying on its surface the local electrostatic fields in the fine pattern and the ridge cleaning rotary member carrying on its surface the local magnetostatic fields in the fine pattern.

If the local electrostatic fields or the local magnetostatic fields were excessively large, the ridge cleaning rotary member would attract the toner even from the continuous groove-like concavities of the irregular surface of the image receiving sheet. Therefore, the electrostatic and magnetostatic fields are formed in the fine patterns, respectively. The fine pattern depends on the toner attracting force of the electric field or magnetic field, and is determined to have configurations and sizes which allow attraction of the toner from the top portions of the ridges of the irregular surface of the image receiving sheet, but do not allow (or hardly allows) attraction of the toner in the continuous groove-like concavities.

The specific patterns of the local electrostatic fields and the local magnetostatic fields are not particularly restricted. For example, the pattern may be a stripe pattern formed of parallel stripes or the like, or formed of parallel and neighboring stripes or the like. Also, the pattern may be in a dispersed spot pattern formed of many spots or dots neighboring to each other.

The ridge cleaning rotary member may be formed of a ridge cleaning roller, a ridge cleaning endless rotary belt or the like.

In the image forming method, the toner receiving concavities of the image receiving sheet form the continuous groove-like concavities. It is preferable that these continuous groove-like concavities are regularly arranged, and each has a width two or more times larger than an average particle diameter of the toner, as will also be described later in connection with the image receiving sheet.

It is preferable that these continuous groove-like concavities are regularly arranged, and each has a width of 20 $\mu$m–500 $\mu$m and a depth of 20 $\mu$m–100 $\mu$m.

Each ridge extending along the continuous groove-like concavity preferably has a width of $1/50$–$1/2$ of the width of the continuous groove-like concavity.

The image formation surface of the image receiving sheet may be covered with a peelable protective sheet after forming the toner image on the image receiving sheet by the printing device. If the protective sheet is to be employed, and the toner is to be removed from the top portions of the ridges of the image receiving sheet, the image formation surface of the image receiving sheet is covered with the peelable protective sheet after removing the toner adhered to the top portions of the ridges.

If necessary, the toner may be separated and removed from the image receiving sheet prior to the step of adhering he toner image onto the image receiving sheet by the printing device. In this case, the peelable protective sheet covering the image receiving sheet is peeled off prior to the formation of the toner image.

The protective sheet may be a light-reflecting sheet if the image receiving sheet is transparent. If the image receiving sheet is opaque, a transparent sheet is employed as the protective sheet. In either case, the image can be viewed from the side of the transparent sheet.

(2) Image Forming Material Reusing Method

According to an image formation material reusing method, the toner is separated and removed by toner separating processing from the image receiving sheet carrying the image formed by the foregoing image forming method, and the image receiving sheet subjected to the toner removal and/or the separated toner are reused.

If the image was formed on the image receiving sheet by the image forming method using the protective sheet, the protective sheet is peeled off, and then the toner separating processing is performed to separate and remove the toner from the image receiving sheet. The protective sheet which was peeled off may also be reused.

This image formation material reusing method is executed for an image receiving sheet, which has the irregular surface provided with a large number of continuous groove-like concavities, and carries a toner image formed by removably adhering the toner to the continuous groove-like concavities according to the non-fixing image forming method described above. The above image receiving sheet may have an image formation surface protected by a protective sheet. More specifically, the method is executed for the image receiving sheet, which is not subjected to conventional toner image fixing processing utilizing heat and/or pressure, and carries the toner image merely adhered thereto. The image formation surface of the image receiving sheet may be merely covered by the peelable protective sheet. Accordingly, the toner can be separated and removed from the image receiving sheet or from the image receiving sheet from which the protective sheet is peeled off.

The image receiving sheet, from which the toner is removed, and/or the removed toner can be reused. If the protective sheet is employed, an appropriate separating and removing method utilizing, e.g., vacuum suction, electrostatic attraction or a separating claw is executed to separate the protective sheet from the image receiving sheet before removing the toner, and at least one of the separated protective sheet, the image receiving sheet from which the toner is removed, and the removed toner can be reused. In this manner, a required energy and a required resource are reduced.

The toner separating processing for separating and removing the toner from the image receiving sheet may be performed by utilizing at least a mechanical force, although not restricted thereto.

For example, the separating processing using the mechanical force is performed by at least a brush device for scrubbing the image formation surface of the image receiving sheet.

Since the portion of the image receiving sheet holding the toner is formed of the continuous groove-like concavities, the toner can be removed from the continuous groove-like concavities by the brush device scrubbing and sweeping the image formation surface of the image receiving sheet along the continuous groove-like concavities. The brush device may include a fiber brush formed of fibers, or may include a magnetic brush formed of magnetic particles collected by a magnetic force. A combination of these brushes may be employed. Typically, the magnetic brush (magnetic brush roller) may include a magnet disposed within a roll, and magnetic particles are shaped into fiber-like forms, which project on the roll surface, owing to relative rotation between the roll and the magnet.

The brush device can be brought into contact with the image formation surface for scrubbing by relatively moving the image receiving sheet and the brush device. For example, the brush device may be a fixed brush, and the image receiving sheet may be brought into contact with the brush device, and may be moved with respect to it for scrubbing. The brush device may be formed of a rotary fiber brush (a roller-like rotary brush, an endless rotary brush belt or the like), which is driven to rotate, or a magnetic brush roller for scrubbing the image receiving sheet with it during the transportation of the sheet.

As another manner of the toner separating processing of separating and removing the toner from the image receiving sheet, toner attraction performed by air suction can be employed in addition to the mechanical force (including vibrations applied to the image receiving sheet).

Depending on the toner, the toner separating processing can be performed by an electrostatic force or a combination of an electrostatic force and a magnetic force.

For example, in the case where the chargeable toner is used, and is electrostatically adhered onto the continuous groove-like concavities of the irregular surface of the image receiving sheet, the separation and removal may be performed by the electrostatic force.

In the case where the chargeable magnetic toner is used, and is adhered onto the continuous groove-like concavities of the irregular surface of the image receiving sheet, the separation and removal may be performed by the electrostatic force and the magnetic force.

If the electrostatic force is used in either of the above cases, an alternating bias (in other words, vibration bias) such as an AC bias may be superimposed on the electrostatic force. Thereby, the toner can be separated more easily and reliably from the image receiving sheet.

If the toner image on the image receiving sheet is formed of the chargeable toner, the electric charges of the toner may be partially lost. Even in this case, the magnetic force can be utilized in addition to the electrostatic force for separating the toner from the image receiving sheet if the toner is the magnetic toner. Therefore, the separation and removal of the toner can be performed more easily and reliably.

The toner separation can be also performed by both the processings, i.e., the toner separating processing, which uses a mechanical force and/or utilizes toner attraction by air suction, and the toner separating processing, which uses the electrostatic force, or a combination of the electrostatic force and the magnetic force.

(3) Image Forming Apparatus and Toner Removing Device

An image forming apparatus including:

a device for supplying an image receiving sheet having an irregular surface provided with a large number of continuous groove-like concavities for receiving toner; and a printing device for adhering a toner image corresponding to an original image to the continuous groove-like concavities of the image receiving sheet supplied from the image receiving sheet supply device.

According to this image forming apparatus, the printing device can implement the image forming method described above.

The toner may adhere to the top portions of the ridges of the irregular surface of the image receiving sheet during formation of the toner image on the image receiving sheet. For removing this toner from the top portions, a ridge toner removing device may be disposed downstream, in the transporting direction of the image receiving sheet, from the printing device.

The image receiving sheet carrying the toner image may be transported to the printing device. For this case, a toner separating device may be disposed upstream, in the image receiving sheet transporting direction, from the printing device for separating and removing the toner from the image receiving sheet. Even in this case, the toner image can be formed again on the image receiving sheet already subjected to the toner removing processing. The toner thus separated and removed can be reused, if desired. In this manner, the image receiving sheet and toner can be recycled.

The device for supplying the image receiving sheet and the toner separating device for separating and removing the toner from the image receiving sheet supplied from the sheet supplying device can provide a device for removing the toner from the image receiving sheet, in other words, toner removing device.

The printing device (i.e., toner image forming device) in the image forming apparatus according to the invention may employ various types of structures.

For example, the printing device may be configured to adhere electrostatically and removably the toner to the continuous groove-like concavities of the irregular surface of the image receiving sheet, if the toner is the chargeable toner.

For example, the printing device of the above type may have a portion for forming the toner image corresponding to the original image information on an image carrier, and a transfer device for electrostatically transferring the toner image onto the image receiving sheet.

In the above case, the portion for forming the toner image corresponding to the original image information on the image carrier may have the following structures.

(1) The structure includes an electrostatic latent image carrier, a device for forming an electrostatic latent image corresponding to original image information on the electrostatic latent image carrier, and a developing device for developing the electrostatic latent image to form a toner image.

In this case, the developing device may serve also as at least a portion of the foregoing toner separating device.

The device for forming the electrostatic latent image may be configured to form the electrostatic latent image on the electrostatic latent image carrier by effecting image exposure, if the electrostatic latent image carrier is a photosensitive member. Also, it may be configured to form the electrostatic latent image by a multi-stylus electrode or by ion flow.

(2) The structure is of a direct recording type, and is configured to adhere electrostatically and directly the toner corresponding to the original image information to the image carrier without forming an electrostatic latent image.

The printing device may be also formed of a device of the direct recording type, which formes the toner image by electrostatically adhering the toner directly to the image receiving sheet without employing the image carrier and without forming the electrostatic latent image.

For example, the printing device may be a so-called toner jet type, or may be configured to form the toner image on the image receiving sheet by injecting electric charges into electrically conductive toner in a developing portion by a record electrode opposed to the image receiving sheet.

The toner separating device may be configured to use at least a mechanical force for separating and removing the toner from the image receiving sheet, although not restricted to this structure.

The toner separating device using the mechanical force may include at least a brush device scrubbing the image receiving sheet surface.

The toner separating device including the brush device can remove the toner from the image receiving sheet by scrubbing the image formation surface of the image receiving sheet with the brush device so that the toner may be swept out along the continuous groove-like concavities of the image receiving sheet.

As already described, the brush device may include a fiber brush, may include a magnetic brush (e.g., a magnetic roller brush) or a combination of them.

In any one of the above cases, the brush device is arranged relatively movably with respect to the image receiving sheet. For example, it may be a fixed brush disposed in a fixed position opposed to the transporting path of the image receiving sheet, a rotary fiber brush (e.g., a roller-like rotary brush, or an endless rotary brush belt) to be driven to rotate, or a magnetic brush roller.

The toner separating device may be configured to perform the toner separation and removal by utilizing toner attraction by air suction in addition to the mechanical force.

When utilizing the mechanical force, a device for applying vibrations to the image receiving sheet may be utilized instead of (or in addition to) the foregoing device such as the brush device scrubbing the image formation surface of the sheet.

Depending on the toner, the device for separating and removing the toner by the electrostatic force for separating the toner may be employed, and also the device for separating and removing the toner by the magnetic force, or a combination of the electrostatic force and the magnetic force for separating the toner may be employed.

In the cases where the electrostatic force is used, an alternating bias (in other words, vibration bias) such as an AC bias may be superimposed on the electrostatic force. Thereby, the toner can be separated more easily and reliably from the image receiving sheet.

The toner separating device, which uses the mechanical force, or utilize the toner attraction by air suction in addition to the mechanical force for the toner separation and removal, may additionally employ the electrostatic force or a combination of the electrostatic force and the magnetic force for the toner separation and removal.

The image forming apparatus may include a toner returning device for supplying and returning the toner separated and removed by the toner separating device to the printing device for reuse. If the printing device includes the developing device, the toner returning device may supply the toner to the developing device.

If the printing device includes the developing device, the developing device may serve also as at least a portion of the toner separating device.

The ridge toner removing device may have the following structures.

(1) The device includes a charging device for charging the top portions of the ridges of the irregular surface of the image receiving sheet to have the same polarity as the chargeable polarity of the toner.

This ridge toner removing device may be used, for example, in the case where the chargeable toner is electrostatically adhered to the image receiving sheet.

In the device, the top portions of the ridges may be charged by contact with an electrically conductive roller made of, e.g., metal carrying a voltage for charging, or may be charged by corona discharging.

For example, the corona discharging device is first located close to the image receiving sheet, and the image receiving sheet is uniformly charged to attain the polarity opposite to the toner with a low voltage of about 100 V and a high current density. In this operation, a majority of the applied charges are stored in the continuous groove-like concavities having a large electrostatic capacitance. Then, a distance between the corona discharging device and the image receiving sheet is increased, and the charges of the same polarity as the toner are applied to the image receiving sheet with a high voltage and a low current density. Thereby, the charges on the ridges are first removed or erased, and then the ridges are charged. However, a majority of high-density charges in the groove-like concavities remain even after the charge removing operation. Therefore, the groove-like concavities and the top portions of the ridges are charged to attain the opposite polarities, and the toner is separated from the top portions of the ridges. At the same time, the effect of holding the toner in the groove-like concavities is enhanced. Naturally, charging of the ridges may be unnecessary if the top portions of the ridges have a small area.

A frictional charging member such as a roller for contact with the ridges may be employed to charge frictionally the ridges by relative movement between the frictional charging member and the ridges.

(2) The ridge toner removing device includes a ridge cleaning rotary member configured to be in contact with or close to the top portions of the ridges of the irregular surface of the image receiving sheet sent from the toner image formation region, and provided at its surface with a local electrostatic field formation portion, and a charging device for forming and dispersing local electrostatic fields in a fine pattern on the surface of the ridge cleaning rotary member by electrically charging the local electrostatic field formation portion of the ridge cleaning rotary member, the local electrostatic fields electrostatically attracting the toner adhered to the top portions of the ridges of the image receiving sheet.

The ridge toner removing device can be used, for example, in the case where the charged toner electrostatically adheres to the image receiving sheet.

In this device, the ridge cleaning rotary member may have the local electrostatic field formation portions in a fine pattern made of a chargeable and insulating material, and dispersed on the surface. The charging device may be configured to charge uniformly each of the local electrostatic field formation portions.

As further specific examples, the ridge cleaning rotary member may have an electrically conductive surface layer, and may be provided at its conductive surface with concavities filled with the chargeable and insulating material (e.g., chargeable and insulating synthetic resin). These concavities may have stripe-like forms defined by parallel grooves or the like, and particularly the parallel neighboring grooves. Alternatively, the concavities may have dispersed dot-like forms, and particularly may have, e.g., dot-like forms neighboring to each other. If the above ridge cleaning rotary member is employed, the charging device may be selected from various kinds of charging devices such as a corona charger provided that it can uniformly charge the chargeable insulating material in each concavity on the rotary member surface layer.

As further specific examples of the ridge cleaning rotary member, the stripe-like concavities may be formed of parallel neighboring grooves or the like each having a width of 10 $\mu$m–20 $\mu$m and a depth of 5 $\mu$m–20 $\mu$m, and spaced by a distance of 2 $\mu$m–20 $\mu$m from each other. The dot-like concavities may neighbor to each other with a similar space therebetween, and each may have a similar width and a similar depth. These concavities are filled with the chargeable insulating material such as a chargeable insulating synthetic resin (e.g., acrylic resin, polyester resin, epoxy resin or the like).

The ridge cleaning rotary member may have a coating surface layer (e.g., surface layer of about 5 $\mu$m–20 $\mu$m in thickness) made of a chargeable insulating material (e.g., chargeable insulating synthetic resin) and serving as the local electrostatic field formation portion. In this case, the charging device may be configured to charge the surface layer locally in a dispersed fashion for forming and dispersing the local electrostatic fields in the fine pattern.

If the above ridge cleaning rotary member is employed, the charging device may be configured to charge locally the surface layer of the rotary member in the dispersed fashion for forming and dispersing the local electrostatic fields in the fine pattern, and for this purpose, may be formed of a charging roller provided with an irregular surface having convexities and concavities, an electrically conductive brush or the like. The charging device may include the conductive brush or a charging blade, which carries an AC voltage.

For example, the local electrostatic fields in the fine pattern formed by the charging device may have parallel stripe-like forms or dot-like forms neighboring to each other. Each of the stripe-like form may have a width of about 5 $\mu$m–20 $\mu$m or about 10 $\mu$m–20 $\mu$m, and may be spaced by a distance of about 2 $\mu$m–20 $\mu$m from the neighboring stripe-like form. The dispersed dot-like forms may neighbor to each other with a similar space therebetween, and each may have a similar width.

If the local electrostatic field were excessively large, the ridge cleaning rotary member would attract the toner even from the concavities of the irregular surface of the image receiving sheet. Therefore, a combination of the ridge cleaning rotary member and the charging member which can provide the fields in the fine pattern is used. The fine pattern depends on the toner attracting force of the electric field, and are determined to have configurations and sizes which allow attraction of the toner from the top portions of the ridges of the irregular surface of the image receiving sheet, but do not allow (or hardly allows) attraction of the toner in the continuous groove-like concavities.

In any one of the above cases, the ridge cleaning rotary member may be formed of a ridge cleaning roller, a ridge cleaning endless rotary belt or the like.

(3) The ridge toner removing device includes a ridge cleaning rotary member configured to be in contact with or close to the top portions of the ridges of the irregular surface of the image receiving sheet sent from the toner image formation region, and provided at its surface with dispersed local magnetostatic field formation portions in a fine pattern.

This ridge toner removing device can be used, for example, in the case where the magnetic toner (typically, chargeable magnetic toner) adheres to the image receiving sheet.

In this device, the ridge cleaning rotary member may have the dispersed local magnetostatic field formation portions in a fine pattern made of a magnetized ferromagnetic material filling concavities formed on its surface. For example, the ridge cleaning rotary member may have the magnetized ferromagnetic material filling the concavities, which are formed on the roller surface, and may be in a stripe-like pattern or the like formed of parallel grooves, and particularly parallel and neighboring grooves or the like. Alternatively, the concavities may be in a dispersed spot pattern formed of dispersed many spots or dots neighboring to each other.

Also, the ridge cleaning rotary member, e. g., roller may have the covering surface layer made of a ferromagnetic material, which can be locally magnetized to form dispersed local magnetostatic fields. The dispersed local magnetostatic fields may be, e.g., in a stripe pattern formed of parallel stripes or the like, and particularly parallel and neighboring stripes or the like, or may be in a dispersed spot or dot pattern formed of dispersed many spots or dots neighboring to each other.

As a further specific example of the ridge cleaning rotary member, the dispersed local magnetostatic fields may have stripe-like forms or dot-like forms. These stripe-like forms may have parallel neighboring stripes or the like each having a width of about 2 $\mu$m–20 $\mu$m or about 10 $\mu$m–20 $\mu$m, and spaced by a distance of about 2 $\mu$m–20 $\mu$m from each other. The dispersed dot-like forms may neighbor to each other with a similar space therebetween, and each may have a similar width.

If the local magnetostatic field were excessively large, the ridge cleaning rotary member would attract the toner even from the continuous groove-like concavities of the irregular surface of the image receiving sheet. Therefore, the magnetostatic field is formed in the fine pattern. The magnetic toner is attracted from the top portions of the ridges of the irregular surface of the image receiving sheet to an extent depending on the fine pattern and the toner attracting force of the magnetic field. The fine patterns are determined to have configurations and sizes which allow attraction of the toner from the top portions of the ridges of the irregular surface of the image receiving sheet, but do not allow (or hardly allows) attraction of the toner in the continuous groove-like concavities.

In any one of the above cases, the ridge cleaning rotary member may be typically formed of a ridge cleaning roller, a ridge cleaning endless rotary belt or the like.

The ridge cleaning rotary member may be configured to provide both the local electrostatic fields in a fine pattern and the local magnetostatic fields in a fine pattern. The ridge cleaning rotary member providing the local electrostatic fields in a fine pattern can be used together with the ridge cleaning rotary member providing the local magnetostatic fields in a fine pattern.

In any one of the above cases, the image forming apparatus may include a toner returning device for supplying the toner separated and removed by the ridge toner removing device to the printing device for reuse. If the printing device includes the developing device, the toner returning device may supply the toner to the developing device.

Any one of the image forming apparatuses described above may include a protective sheet peeling device disposed upstream, in the image receiving sheet transporting direction, to the toner separating device for peeling off the peelable protective sheet covering the image formation surface of the image receiving sheet to be subjected to the toner separating and removing operation. The apparatus may include a protective sheet covering device disposed downstream from the printing device and the ridge toner removing device for covering the image formation surface of the image receiving sheet with the peelable protective sheet. Both the protective sheet peeling device and the protective sheet covering device may be employed.

In the image forming method described above, the image formation surface of the image receiving sheet may be covered with the peelable protective sheet as already described, in which case the protective sheet must be peeled off and removed prior to the separation and removal of the toner if the toner image is to be formed again after separating and removing the toner from the image receiving sheet. In this case, the protective sheet peeling device can peel and remove the protective sheet from the image receiving sheet prior to the separation and removal of the toner. By employing the protective sheet covering device, the image formation surface of the image receiving sheet can be covered with the protective sheet after removing the toner from the top portions of the ridges subsequently to the image formation on the image receiving sheet.

(4) Image Receiving Sheet

An image receiving sheet for forming a toner image by removably adhering toner, includes an irregular surface provided with a large number continuous groove-like concavities for accommodating the toner. The toner image can be formed by removably adhering the toner to the continuous groove-like concavities, and ridges extending along the continuous groove-like concavities can protect the toner adhered to the continuous groove-like concavities.

This image receiving sheet can be applied to the non-fixing image forming method and the image formation material reusing method.

It is generally desired that the irregularities of the image receiving sheet have sizes not remarkably deteriorating a quality of the toner image formed thereon, that the sizes and strengths of the irregularities including the width and height of the ridge as well as the width and depth of the continuous groove-like concavity (in other words, height of the ridge extending along the groove-like concavity) are determined to allow sufficient protection of the toner adhered to the continuous groove-like concavities from an external force, and that the sheet can be manufactured at a minimum cost, is environmentally safe, has a good appearance, and can provide a nice feel when touched.

For example, the continuous groove-like concavities and the ridges may be dispersed substantially uniformly, and the total area occupied in the irregular surface by the continuous groove-like concavities is larger than the total area occupied by the ridges. Each of the continuous groove-like concavity has larger width and depth than the toner size to be used, and can accommodate two or more toner particles.

More preferably, as already described in connection with the image forming method, the continuous groove-like concavities are arranged regularly, and each have a width larger by two or more times than the average particle diameter of the toner.

Preferably, the continuous groove-like concavities are arranged regularly, and the continuous groove-like concavities and the ridges have uniform sizes. Each of the continuous groove-like concavities has a width of 20 $\mu$m–500 $\mu$m and a depth of 20 $\mu$m–100 $\mu$m.

The ridge extending along the continuous groove-like concavity preferably has the width equal to 1/50–1/2 of the width of the continuous groove-like concavity.

The image receiving sheet according to the invention may be selectively made of various materials such as paper, synthetic resin (polyester, polyethylene terephthalate, polyolefine (e.g., polypropylene or polyethylene), polyimide, polyamide or the like), or a combination thereof. For example, a surface layer may be made of synthetic resin (e.g., thermoplastic resin such as polyethylene, acryl or polyester) or a mixture of such resin and, e.g., white pigment (e.g., titanium oxide, zinc oxide, silica, alumina, clay or talc) or loading pigment, and may be applied to a sheet core layer made of, e.g., paper to form the predetermined continuous groove-like concavities, which are shaped by a shaping die (e.g., master roller) having appropriate configurations, although not restricted to this. The irregularities may be also formed by casting of resin into dies.

A polymer film which is utilized as a so-called resist may be formed on the sheet core layer, and may be exposed through a mask for forming the predetermined continuous groove-like concavities. Then, portions corresponding to the continuous groove-like concavities may be removed. More specifically, a polymer film allowing photo-polymerization may be formed on the sheet core layer, and may be exposed through a mask having openings corresponding to the ridges to be formed, and thereafter the portions corresponding to the continuous groove-like concavities may be removed, e.g., by rinsing.

The predetermined continuous groove-like concavities may be formed by cutting the surface layer of the image receiving sheet with a dicing saw or a precision cutting tool.

In any one of the above cases, a pigment (e.g., white pigment), titanium oxide, zinc oxide or the like having semiconductive properties may be mixed into the surface layer material if excessive charging may occur to an extent causing excessive attraction of the toner and making the separation and removal of the toner difficult.

The sheet core layer may be an electrically conductive layer having a resistance, e.g., of about $10^4$ Ω·cm–$10^{10}$ Ω·cm, and the surface layer (irregular layer) having the continuous groove-like concavities may be formed of an insulating layer having a resistance, e.g., of about $10^{12}$ Ω·cm or more. This allows easy transfer of the toner image onto the image receiving sheet by utilizing an electrostatic force, and also allows easy separation and removal of the toner from the image receiving sheet by utilizing the electrostatic force. Further, this is advantageous in view of the toner retaining force.

The rear surface of the image receiving sheet opposite to the continuous groove-like concavities may have a volume resistivity and a surface resistivity, which are controlled by applying a surfactant thereto or appropriate coating.

The surface having the continuous groove-like concavities of the image receiving sheet, and particularly the surfaces of the ridges (only ridges or at least top portions of the ridges) may be coated with a lubricant such as fluororesin for allowing easy removal of the toner adhered thereto.

As already described, the continuous groove-like concavities may be arranged regularly. This is preferable in view of formation of the toner image and subsequent separation of the toner (particularly, easy separation of the toner). As an example of the regular arrangement, all the continuous groove-like concavities may be straight or wavy in parallel to each other, or may be divided into a plurality of groups each including a plurality of continuous groove-like concavities extending parallel to each other.

In any one of the above cases, the ridges may be projected in a slightly inclined direction to a position over the continuous groove-like concavity for further protecting the toner adhered to the continuous groove-like concavity. When an external force is applied to the ridge thus formed, the ridge is likely to bend and close the opening of the concavity so that the toner in the concavity can be protected further effectively. If the ridges described above are employed, the toner image formation is performed, for example, in such a manner that the ridge is brought into contact with the electrostatic latent image carrier or the like, and the groove-like concavities are sufficiently opened owing to the movement relative to the surface of the electrostatic latent image carrier or the like.

The image receiving sheet may be selected from various types such as a continuous type, a continuous and foldable type or a single-sheet or cut-sheet type.

The image receiving sheet may be entirely transparent.

Description will now be given on the developer. Various kinds of developer can be selected as the developer containing toner, which can be used for implementing the image forming method and the image formation material reusing method.

The toner may have following two of more features.

(1) The toner does not require the fixing, has high durability and allow recycling.

(2) The toner has a small particle diameter. (This is required for reducing sizes of the concavities of the irregular surface of the image receiving sheet, and thereby improving the image quality.)

(3) The toner is magnetic toner. (Separation and removal from the image receiving sheet can be easily performed by utilizing a magnetic force. Separation of impurities can be easily performed in the recycling process.)

(4) The toner particle may have either a spherical form or an irregular form, but is determined to allow smooth adhesion to the image receiving sheet and easy separation and removal of the toner from the image receiving sheet.

Since the spherical toner particles are likely to be rolled by an electrostatic force, such an advantage can be achieved that the toner is effectively prevented from remaining on the ridges of the image receiving sheet having a high position energy.

(5) Although the chargeable properties are generally desired, electrically conductive toner may be desired or required depending on the properties of the image receiving sheet.

(6) The toner can be manufactured at a low cost, is environmentally safe, and has image retaining properties and good durability.

The developer which is used for implementing the non-fixing image forming method and image formation material reusing method may be either a so-called one-component developer or a two-component developer containing the toner and particles corresponding to carrier. If the two-component developer is used, the developer may have such characteristics that the toner is made of a magnetic material, and the particles corresponding to the carrier are made of a non-magnetic material in contrast to the conventional two-component developer requiring the conventional fixing processing. In this case, the non-magnetic particles may adhere to the image receiving sheet. However, this adhesion causes no problem if the particles are made of a transparent material or a material of the same color as the image receiving sheet surface (e.g., white particles if the image receiving sheet is white).

If the two-component developer containing the chargeable magnetic toner and the non-magnetic carrier-corresponding particles are used, an alternating bias (in other words, vibration bias) such as an AC bias may be superimposed on the electrostatic force for separating the toner from the image receiving sheet by utilizing the electrostatic force. Application of the alternating bias (vibration bias) achieves an effect of causing vibration and collision of the non-magnetic charged particles, and therefore facilitates the separation of the toner.

In view of the above, the developer which contains the toner and can be used for implementing the non-fixing image forming method and the image formation material reusing method according to the invention may be formed of a mixture of colored chargeable magnetic toner and transparent and/or white chargeable particles having the chargeable polarity opposite to that of the chargeable polarity of the colored chargeable magnetic toner.

The above colored chargeable magnetic toner may contain ferromagnetic ferrite powder, although not restricted to this.

The transparent and/or white chargeable particles may be made of organic or inorganic compound having contact chargeability of the polarity opposite to that of the toner.

In any one of the types of the developer, the toner may have an average particle diameter of about 2 $\mu$m–30 $\mu$m, and more preferably of about 5 $\mu$m–30 $\mu$m. For reproducing images in high resolution, the toner may have an average particle diameter of about 2 $\mu$m–9 $\mu$m, and more preferably of about 5 $\mu$m–9 $\mu$m. If the toner average diameter were larger than 30 $\mu$m, the resolution of images would be excessively low. If the toner average diameter were smaller than 2 μm, the properties of separation from the image receiving sheet would be excessively low. Accordingly, the foregoing ranges are preferable.

In the case where the developer is formed of a mixture of the colored chargeable magnetic toner and the chargeable transparent and/or white particles as described above, the colored chargeable magnetic toner preferably has the average particle diameters in the foregoing range. Similarly to this toner, the transparent and/or white particles preferably have an average particle diameter of about 2 μm–30 μm, and more preferably of about 5 μm–30 μm.

Embodiments of the invention will now be described with reference to the drawings.

FIG. 1 shows by way of example a schematic structure of an image forming apparatus which can implement a non-fixing image forming method and an image formation material reusing method.

The image forming apparatus shown in FIG. 1 includes a photosensitive member 1 serving as an electrostatic latent image carrier. Around the photosensitive member 1, a charger 2, an image exposing device 3, a developing device 4, a transfer device 5, a cleaning blade 6 and a charge erasing device 7 are arranged in this order.

The developing device 4 also serves as a part of a toner separating device 8.

In FIG. 1, a fixed brush B1 is disposed in a fixed position between the photosensitive member 1 and the developing device 4 for separating and removing toner, and is opposed to a transporting path of an image receiving sheet. The brush B1 also forms a part of the toner separating device 8.

In FIG. 1, a supply portion 101 is disposed on the left of the developing device 4 for supplying the continuous image receiving sheet in a folded form. A ridge toner removing device 9 is disposed on the right side of the photosensitive member 1 and the transfer device 5. A discharge tray 102 for receiving the discharged image receiving sheet, on which toner images are formed, is disposed on the right side of the device 9.

The photosensitive member 1 is driven to rotate clockwise in the figure by a drive device (not shown) for image formation.

The charger 2 carries a DC voltage of, e.g., −6000 V supplied from a power source PW1, and thereby can uniformly charge the photosensitive member 1, which is being driven to rotate to carry a predetermined potential of, e.g., −600 V.

The image exposing device 3 performs the image exposure corresponding to original image information to form an electrostatic latent image on a charged region of the photosensitive member 1, which is charged by the charger 2.

The image exposing device may include a scanner for optically scanning the original image and performing the image exposure on the photosensitive member 1.

The developing device 4 has a magnet roller Mg having magnetic poles, and a developing roller 41 fitted around the magnet roller Mg. In the developing operation, a drive device (not shown) drives the developing roller 41 to rotate clockwise in the figure. The developing roller 41 is supplied with the DC developing bias of, e.g., −200 V from a power source PW4.

Developer DV for the development is formed of a mixture of black and negatively chargeable magnetic toner and contact-chargeable (positively chargeable) non-magnetic white particles corresponding to carrier, although not restricted thereto. The toner contains, as a magnetic material, ferromagnetic ferrite powder. The toner and the white particles may have the average particle diameter of about 2 μm–30 μm, or of about 5 μm–30 μm, and have the average particle diameter of about 10 μm in this embodiment.

In connection with the particle diameters of the toner and others, description will also be given on irregularities of the image receiving sheet.

Figure 12A:
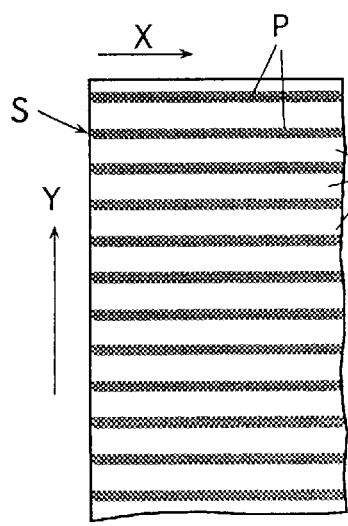
FIGS. 12(A)–12(F) show patterns of irregularities of the image receiving sheets, respectively.
Figure 12B:
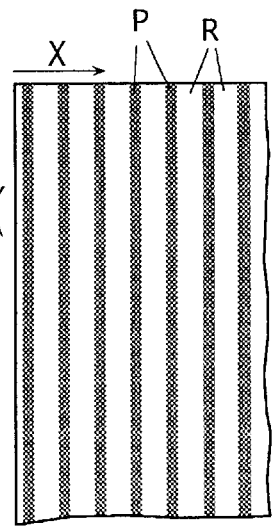
Figure 12C:
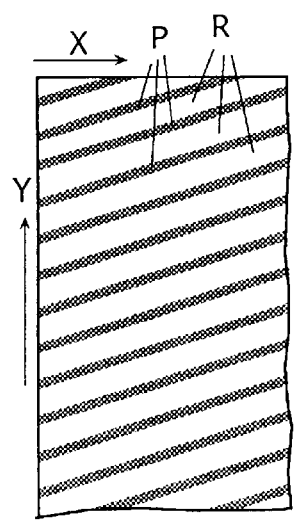
Figure 12D:
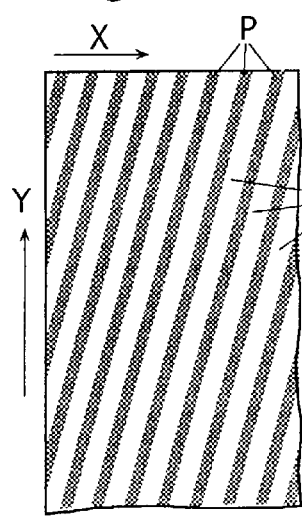
Figure 12E:
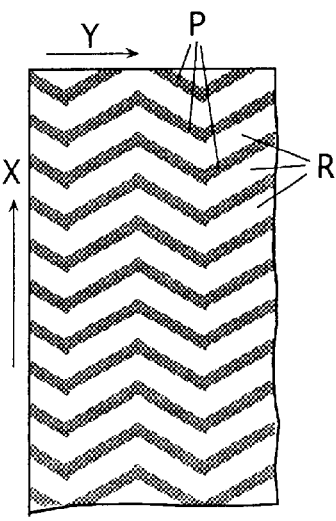
Figure 12F:
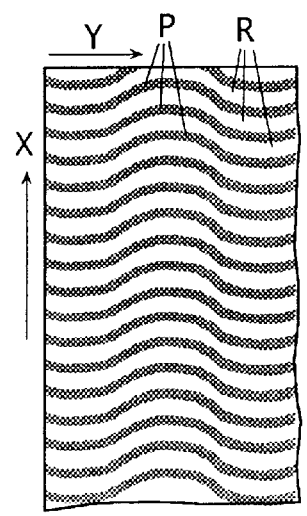
Figure 12G:
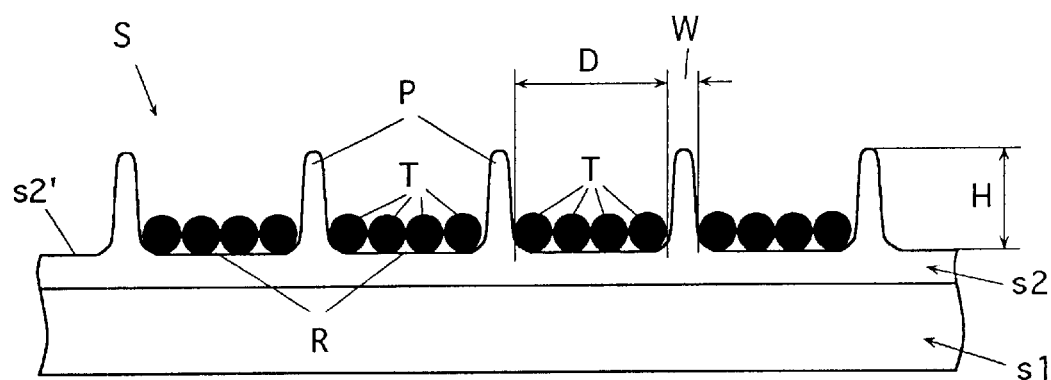
FIG. 12(G) is a cross section showing, on an enlarged scale, the image receiving sheet.

The image receiving sheet S is formed of a sheet core layer s1 shown in FIG. 12(G) and an irregular layer s2, which is made of synthetic resin and white pigment applied onto one side of the layer s1, and has a white appearance as a whole, although not restricted to this. In the figure, T indicates the toner shown in an exaggerated manner.

As shown by way of example in FIGS. 12(A)–12(F), the pattern of irregularities is determined to provide continuous groove-like concavities R, which are arranged regularly, and are spaced by a predetermined distance from each other. A ridge P is formed between the continuous groove-like concavities R neighboring together, and extends along the groove-like concavity R.

In the sheet shown in FIG. 12(A), the concavity R and the ridge P extend in a direction X perpendicular to a sheet feed direction Y. In the sheet shown in FIG. 12(B), the concavity R and the ridge P extend in the sheet feed direction Y. In the sheet shown in FIG. 12(C), the concavity R and the ridge P are parallel to each other, and are slightly inclined with respect to the direction X perpendicular to the sheet feed direction Y. In the sheet shown in FIG. 12(D), the concavity R and the ridge P are parallel to each other, and are slightly inclined with respect to the sheet feed direction Y. In the sheets shown in FIGS. 12(E) and 12(F), each of the concavity R and the ridge P has a wavy form, and is parallel to the others. In FIG. 12(E), each of the concavity R and the ridge P has a zig-zag form. In FIG. 12(F), each of the concavity R and the ridge P has a smoothly curved wavy form. The sheet feed direction Y indicates a direction in which the image receiving sheet S is fed or transported, e.g., for forming images on the image receiving sheet S and for separating and removing the toner from the image receiving sheet S, as will be described later.

In this embodiment, the irregularities are formed in the pattern shown in FIG. 12(D).

In FIG. 12(G), the continuous groove-like concavity R of the irregular surface s2' provided by the irregular layer s2 may have a width D of, e.g., about 20 μm–500 μm (about 90 μm in this embodiment). A height H of the ridge P (in other words, depth of the concavity) may be in a range from about 20 μm to about 100 μm, and is equal to about 45 μm in this embodiment. A width W of the ridge P may be equal to about ⅟₅₀–½ of the concavity width D, and is equal to about 10 μm in this embodiment.

The image receiving sheet S has the irregular surface s2', in which the concavities R and the ridges P are dispersed substantially uniformly. The total area occupied by the concavities R of the irregular surface s2' is larger than the total area occupied by the ridges P. Each concavity R has a depth and a width, which are larger than the average particle diameter of the toner, and therefore can receive or accommodate two or more toner particles.

Although this embodiment employs the continuous image receiving sheet of the foldable type, the image receiving sheets of a cut-sheet type may be employed.

In the image receiving sheet S, the sheet core layer s1 has an electrical conductivity of, e.g., about $10^4$ Ω·cm–$10^{10}$ Ω·cm, and the irregular layer s2 has an insulating property (e.g., $10^{12}$ Ω·cm or more).

The image receiving sheet S may be entirely transparent.

In the image forming apparatus, the toner separating device 8 includes the fixed brush B1, the developing device 4 and a charger 81 located above the developing roller 41 of the developing device 4 with the image receiving sheet transporting path therebetween. The charger 81 in this embodiment is a corona charger. However, the charger 81 may be of another type such as a charging brush type or a charging roller type. For separating and removing the toner from the image receiving sheet S, the charger 81 is supplied with a DC voltage of, e.g., −1000 V and an AC voltage in a superimposed fashion for separation and removal of the toner from a power source PW8.

The transfer device 5 is formed of a charger of a corona discharging type, and is supplied with a DC transfer voltage of, e.g., +1000 V from a power source PW5 for transferring the toner image from the photosensitive member 1 onto the image receiving sheet S.

The ridge toner removing device 9 is formed of a charger 90 disposed above the image receiving sheet transporting path, a toner scrubbing roller 91 disposed under the image receiving sheet transporting path, and a blade 92 for scraping off the toner and others from the roller 91. Instead of the roller 91, the device may employ, for example, a rotary belt, a roller provided with toner removing projections or a rotary belt provided with toner removing projections.

The charger 90 in this embodiment is a charging brush, but another type of the charger may be employed. The charger 90 is supplied with a DC voltage of, e.g., −300 V from a power source PW9 for removing the toner from the top portions of the ridges of the image receiving sheet.

The blade 6 in contact with the photosensitive member 1 as well as the roller 91 and the blade 92 are surrounded by a casing 93. A transporting screw 61 is disposed in the lower portion of the casing, and a developer transporting pipe 62 extends from the screw 61 to the developing device 4. The screw 61, pipe 62 and others form a developer returning device 60 for supplying the developer to the developing device 4.

According to the image forming apparatus described above, the charger 2 uniformly charges the surface of the photosensitive member 1, and the image exposing device 3 effects the image exposure based on the original image information on the charged region so that an electrostatic latent image is formed on the photosensitive member 1. The developing device 4 develops the electrostatic latent image into the visible toner image.

In this operation, the developing roller 41 holds, on it surface, spikes of the developer DV containing magnetic toner and taking the form of a magnetic brush, and is driven to rotate clockwise in the figure. Also, the developing roller 41 is supplied with the developing bias.

The toner image thus formed moves to a transfer region containing the transfer device 5 in accordance with rotation of the photosensitive member 1.

The image receiving sheet S is supplied from the image receiving sheet supply portion 101, and is sent to the transfer region by a feed roller pair F1. The image receiving sheet S thus sent may already carry a toner image, in which case the sheet S which is being transferred by the roller pair F1 is subject to the toner separating and removing operation by the toner separating device 8.

As shown in FIG. 2(A), the sheet feed roller pair F1 includes lower and upper rollers F11 and F12 opposed together with a nip space n therebetween. The nip space n depends on a strength and others of the sheet (particularly, the ridges P), and is substantially equal to 0.8–0.9 times larger than a total thickness t of the sheet S in this embodiment, although not restricted to this range. If the space n is smaller than 0.8 t, the ridges P are liable to collapse. If n is larger than 0.9 t, a failure may occur in sheet feeding operation. A sheet feed roller pair F2 (lower and upper rollers F21 and F22) which will be described later has a nip space similar to the above.

In the toner separating device 8, the charger 81 applies electric charges for toner separation and removal to the image receiving sheet S. Thereby, the toner adhered to the concavities of the irregular surface of the image receiving sheet is separated therefrom, and moves toward the developing roller 41, or the toner in the concavities attain the state allowing easy separation. The toner moves toward the developing roller 41 owing to the electrostatic force as well as the influence of the stirring by the magnetic force applied by magnetic brush spikes on the developing roller 41 and a slight mechanical scrubbing force applied by the magnetic brush spikes. As a resultant phenomenon, a part of white particles in the spikes adhere to the image receiving sheet S. This effectively affects the removal of black toner. The toner thus separated and removed will be reused in the developing device 4.

Subsequently to the toner separation by the magnetic brush on the developing roller 41, the brush B1 formed of brush fibers removes the toner. The brush B1 scrubs the image formation surface of the sheet S to separate and remove the toner, if present thereon. The toner T may be still adhered to the continuous groove-like concavity R, which is slightly inclined with respect to the moving direction Y of the image receiving sheet S as shown in FIG. 12(D). The toner T thus adhered is smoothly separated and removed by sweeping out it along the continuous groove-like concavity R along the advance of the sheet S. The toner separated and removed by the brush B1 falls into the developing device 4 for reuse.

Instead of the fixed brush B1, a rotary brush roll or the like may be employed. The fixed brush, rotary brush roller or the like which is disposed in a fixed position for toner separation and removal may be disposed upstream to the developing device 4 instead of the position shown in FIG. 1. The brushes may be disposed in the same position as the brush B1 in FIG. 1 and in a position upstream to the developing device 4, respectively.

In any one of the above cases, it is preferable that the continuous groove-like concavities of the image receiving sheet S extend in the sheet feed direction Y as shown by way of example in FIGS. 12(B), 12 (D), 12(E) and 12(F) so that the magnetic brush spikes of the magnetic brush can come into smooth contact with the toner in the concavities for allowing easy separation and removal of the toner by the magnetic force and the electrostatic force, and the magnetic brush or fiber brush can smoothly sweep out the toner along the continuous groove-like concavities R.

The image receiving sheet S which is already subjected to the toner separation described above moves to the transfer region, in which the transfer device 5 transfers the toner image formed on the photosensitive member 1. This toner image transfer is performed by electrostatically transferring the toner in the toner image primarily onto the concavities R of the irregular surface of the image receiving sheet. In this operation, the white particles which were adhered to the image receiving sheet in the toner separating operation by the device 8 move toward the photosensitive member 1.

After the transfer, the developer remaining on the photosensitive member 1 is removed by the blade 6, and is returned to the developing device 4 by the developer returning device 60 for reuse. After the transfer, the electric charges remaining on the photosensitive member 1 are erased by the charge erasing device 7.

The image receiving sheet S carrying the toner image thus transferred moves to the ridge toner removing device 9, and is supplied with charges of the same polarity as the chargeable polarity of the toner by the charger 90 (or conductive brush). Thereby, the toner which was adhered to the top portions of the ridges P of the irregular surface of the image receiving sheet is separated therefrom, or attains a state allowing easy separation so that the toner is removed from the top portions of the ridges by the roller 91 scrubbing the ridges.

The toner thus separated is scraped off by the blade 92 in contact with the roller 91, and is returned to the developing device 4 by the returning device 60 for reuse.

In this manner, the toner image is formed, and the toner is removed from the ridges. The image receiving sheet S thus processed is fed by the feed roller pair F2, and is accommodated in the discharge tray 102.

The toner image which is formed on the image receiving sheet S as described above is in such a state that the toner forming the image is located within the concavities R of the irregular surface s2' of the image receiving sheet, and is protected by the ridges P of the irregular surface.

The ridges P are not mere projections which are dispersed on the sheet surface and are independent from each other, but extend along the groove-like concavities R. Therefore, the ridges P have a sufficient resistance against deformation such as bending, and can cover the toner in the concavities even when deformed into inclined positions by an external force, because they extend along the continuous groove-like concavities. Thereby, the toner image formed on the image receiving sheet can maintain the state of the required toner image unless an excessively large external force is applied, although the toner image is merely adhered to the sheet, and is not subjected to fixing processing such as heating employed in the conventional image forming method. During the operation of viewing the toner image on the image receiving sheet, storing the image receiving sheet, or merely moving the sheet, the image receiving sheet may come into contact with another sheet or may be touched with a finger so that a small external force is applied thereto. However, such a small external force does not cause disadvantages such as remarkable disturbance of the toner image and adhesion of the toner to the rear side of the other overlaid image receiving sheet.

Since the toner is merely and therefore removably adhered to the image receiving sheet, the toner can be separated and removed so that the separated toner and the image receiving sheet subjected to the toner separation can be reused.

Figure 13A:
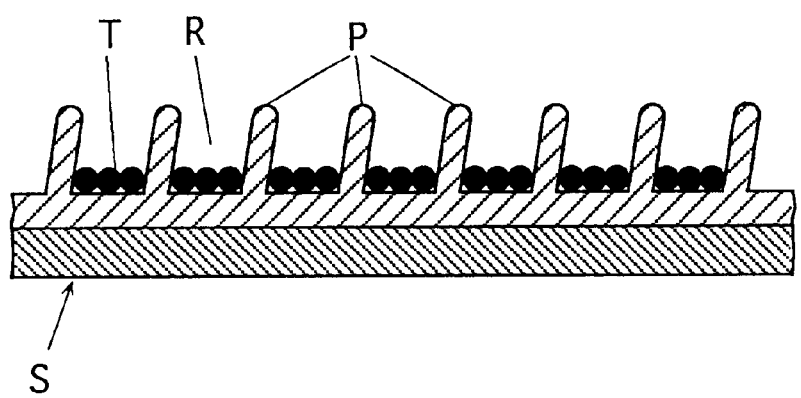
FIG. 13(A) is a cross section of the image receiving sheet provided with ridges projected in an inclined direction.
Figure 13B:
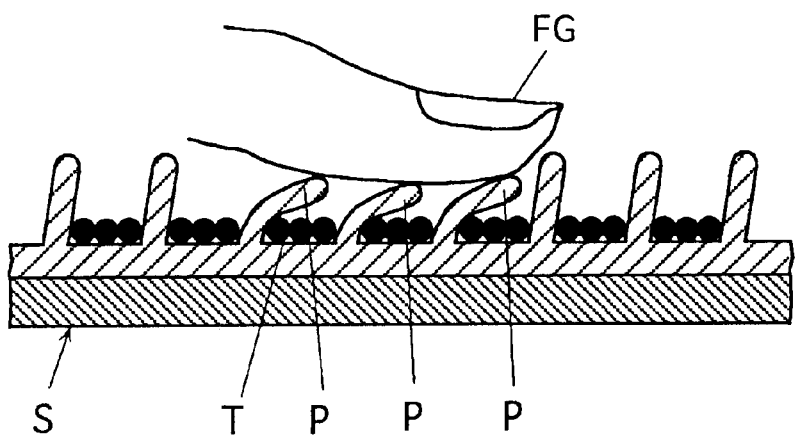
FIG. 13(B) shows a state of the ridges of the sheet deformed by an external force applied by a finger.
Figure 13C:
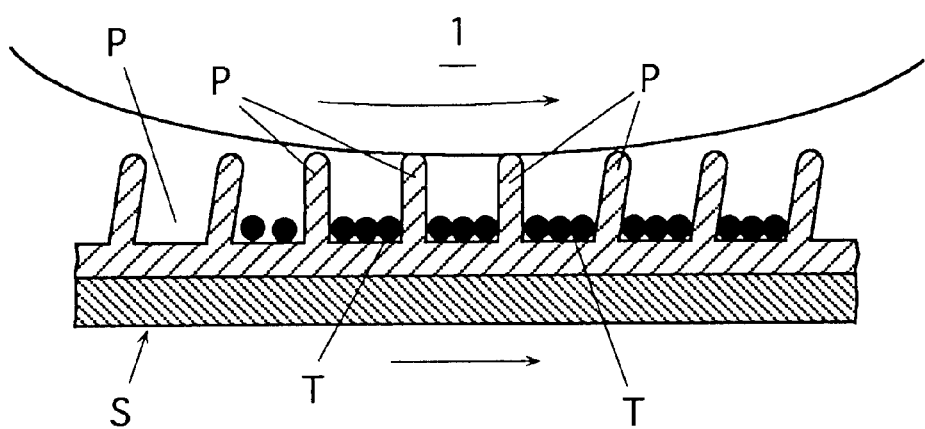
FIG. 13(C) shows by way of example a manner of opening the continuous groove-like concavities on the sheet for the toner image formation.

For protecting more effectively the toner image within the continuous groove-like concavities, the ridges P may be formed as shown in FIG. 13(A), in which the ridges are substantially regularly inclined, for example, in the same direction and at the same angle so that each ridge P is slightly inclined to extend over the continuous groove-like concavity R. According to this structure, the ridge P which receives the external force from a finger FG is likely to bend or incline to a position covering the opening of the concavity R, as shown in FIG. 13(B), and therefore can protect the toner T in the concavities R more effectively. If the ridges P described above are employed, the toner image formation is performed in such a manner that the inclined ridge P comes into slight contact with the photosensitive member 1 as shown in FIG. 13(C), and thereby the ridge R is bent to open sufficiently the continuous groove-like concavity R by the relative motion with respect to the surface of the photosensitive member 1.

In the structure provided with the toner separating device, the toner separating and removing brush B1 may be eliminated. Conversely, the toner separating and removing means formed of the magnetic brush may be eliminated.

Figure 2B:
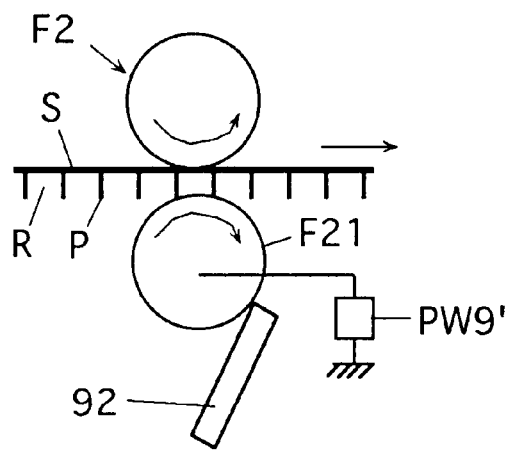
FIG. 2(B) shows the sheet feed roller pair utilized in a ridge toner removing device.

Instead of the structure of the ridge toner removing device 9, the ridge toner removing device may be configured to use the sheet feed roller pair F2 for applying charges of the polarity opposite to the chargeable polarity of the toner to the ridges P. FIG. 2(B) shows an example of such a structure. A power source PW9' supplies a voltage to the lower roller F21 of the roller pair F2 so that the ridges are charged to the polarity opposite to the chargeable polarity of the toner to achieve or promote separation of the toner from the ridges. Also, the rotation of the lower roller F21 removes the toner which is still adhered to the ridges P, and the toner adhered onto the roller surface is scraped off by the blade 92.

Figure 2C:
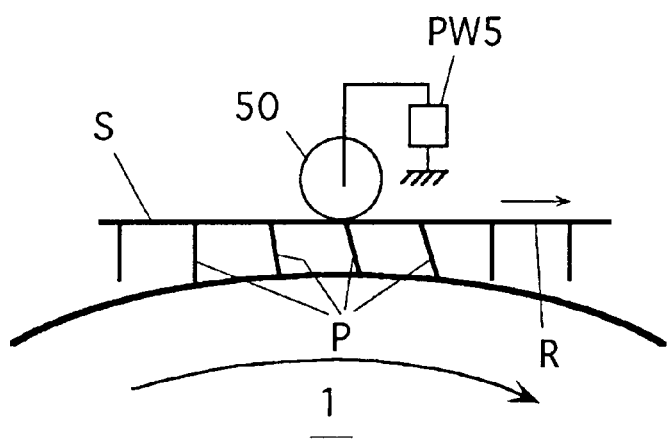
FIG. 2(C) shows an example of a structure using a transfer roller as a transfer device.

The transfer charger 5 may be replaced with a transfer roller 50 shown in FIG. 2(C). The transfer roller 50 is supplied with a transfer voltage from the power source PW5, and is in contact with the rear surface of the sheet. According to the structure employing the transfer member in contact with the rear surface of the sheet, the contact transfer member brings the sheet S into slight contact with the electrostatic latent image carrier (photosensitive member 1) so that the ridges P are deformed, and will be elastically restored after passing through the transfer region. This elastic restoring operation can be utilized to suppress the toner adhesion to the ridges P. In this case, the sheet S, particularly the ridges and further particularly the top portions of the ridges may be coated with a lubricant such as fluororesin. Naturally, the sheet S may be coated with the lubricant even in the case not utilizing the deformation and elastic restoration of the ridges shown in FIG. 2(C).

Figure 3:
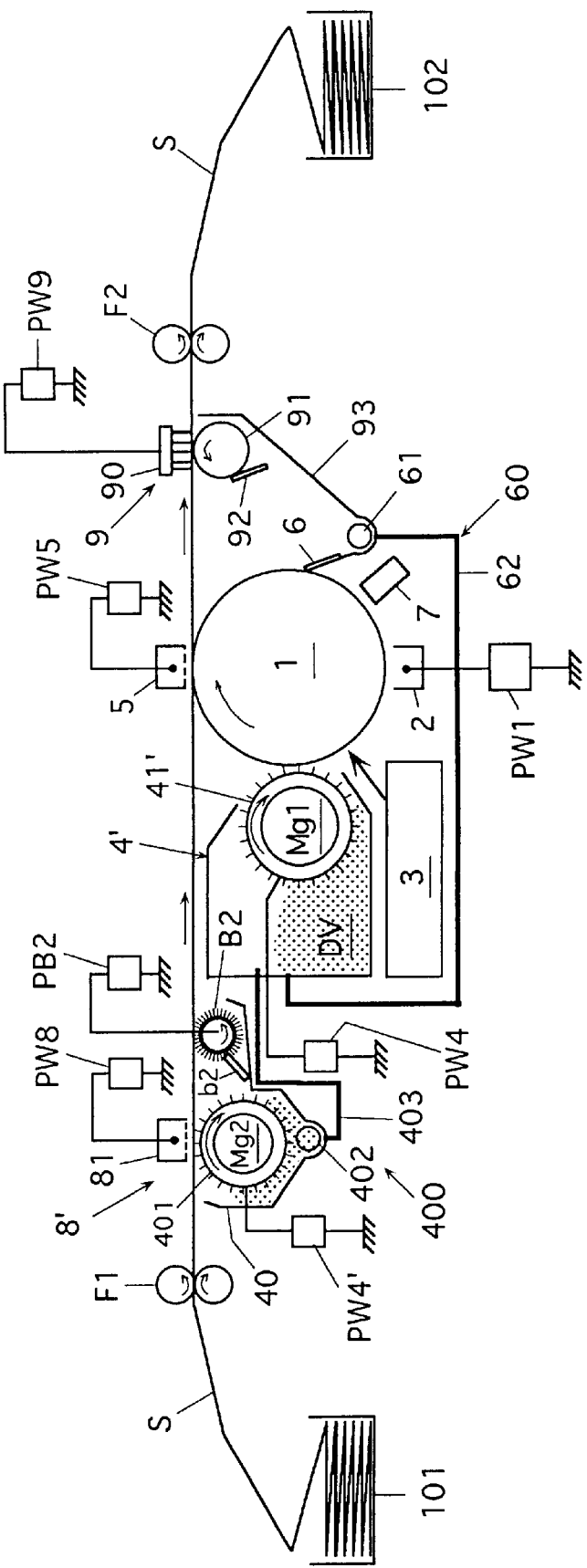
FIG. 3 shows a schematic structure of another example of the image forming apparatus for implementing the non-fixing image forming method and the image formation material reusing method according to the invention.

Referring to FIG. 3, description will now be given on another example of the image forming apparatus, which can be used for implementing the non-fixing image forming method and the image formation material reusing method according to the invention.

The image forming apparatus shown in FIG. 3 differs from the image forming apparatus shown in FIG. 1 in that a developing device 4' is employed instead of the developing device 4, and a toner separating device 8' is disposed upstream to a developing device 4' and is independent of a developing device 4'. Structures other than the above are the same as those shown in FIG. 1. The developer Dv and the image receiving sheet S are the same as those already described. The same parts and portions as those in FIG. 1 bear the same reference numbers.

Similarly to the developing device 4, the developing device 4' has a magnet roller Mg1 having magnetic poles, and a developing roller 41' fitted around the magnet roller Mg1. In the developing operation, a drive device (not shown) drives the developing roller 41' to rotate clockwise in the figure. The developing roller 41' is supplied with the DC developing bias of, e.g., −200 V from a power source PW4. The developing device 4' develops the electrostatic latent image on the photosensitive member 1 in a manner similar to that of the developing device 4 shown in FIG. 1.

The toner separating device 8' has a magnet roller Mg2 having magnetic poles, and a roller 401 fitted around the magnet roller Mg2. The lower side of the roller 401 is surrounded by the casing 40, in which the developer DV is accommodated in advance.

The toner separating device 8' includes the charger 81 located above the developing roller 401 with the image receiving sheet transporting path therebetween.

The toner separating device 8' also includes a rotary brush roller B2, which is disposed between the roller 401 and the developing device 4', and is opposed to the sheet transporting path.

A transporting screw 402 is arranged in a lower end of the casing 40. The screw 402 and a toner transporting pipe 403 which extends therefrom to the developing device 4' form a toner returning device 400.

For separating and removing the toner from the image receiving sheet S passing through the toner separating device 8', the drive device (not shown) drives the roller 401 to rotate clockwise in the figure. The roller 401 is supplied with the DC bias of, e.g., −200 V from a power source PW4'. Further, the charger 81 is supplied with a DC voltage of, e.g., −1000 V and an AC voltage in a superimposed fashion for separation and removal of the toner from the power source PW8.

In this toner separating device 8', the toner on the image receiving sheet S moves toward the developing roller 401 owing to the influence of the stirring by the magnetic force applied by magnetic brush spikes on the developing roller 401 and the electrostatic force as well as a slight mechanical scrubbing force applied by the magnetic brush spikes, similarly to the toner separating device 8 shown in FIG. 1. As a resultant phenomenon, a part of white particles adhere to the image receiving sheet S. This effectively affects the removal of toner. The toner thus separated and removed is returned to the developing device 4' by the toner returning device 400 for reuse.

Subsequently to the toner separation by the magnetic brush on the developing roller 401, the rotary brush roller B2 formed of brush fibers separates and removes the toner. The brush roller R2 is supplied with the DC voltage of, e.g., −500V for toner separation and the AC voltage in a superimposed fashion from the power source PB2. The rotary brush roller B2 mechanically scrubs the image formation surface of the sheet S to separate and remove the toner still remaining thereon. For this separation, the electrostatic force is also utilized. Before this operation, the toner T may be still adhered to the continuous groove-like concavities R, which are slightly inclined with respect to the feed direction Y of the image receiving sheet S as shown in FIG. 12(D). This toner T is smoothly swept out along the groove-like concavities R in accordance with the movement of the sheet S, and thereby is separated and removed. The toner adhered to the roller B2 is scraped off by the blade b2, and is moved into the casing 40 for reuse.

The toner image will be formed on the image receiving sheet already subjected to the toner removing processing in the same manner as that of the image forming apparatus shown in FIG. 1. Removal of the toner from the top portions of the ridges of the irregular surface of the image receiving sheet and other operations are also performed in the same manners.

Instead of the rotary brush roller B2, a fixed brush or the like supplied with a voltage may be employed. The rotary brush roller, fixed brush or the like, which is disposed in a fixed position and is supplied with a voltage for toner separation and removal, may be disposed upstream to the roller 401 instead of the position shown in FIG. 3. The foregoing rollers or the brushes may be disposed in the same position as the brush B2 in FIG. 3 and in a position upstream to the roller 401, respectively.

In the structure provided with the toner separating device, the toner separating and removing brush B2 may be eliminated. Conversely, the toner separating and removing means formed of the magnetic brush may be eliminated.

Referring to FIGS. 4(A) and 4(B), description will now be given on further another example of the image forming apparatus, which can be used for implementing the non-fixing image forming method and the image formation material reusing method according to the invention.

The image forming apparatus shown in FIG. 4 differs from the image forming apparatus shown in FIG. 1 in that a developing device 4" is employed instead of the developing device 4, a toner separating device 8" is disposed upstream to a developing device 4" instead of the toner separating device 8, and a ridge toner removing device 9' is employed instead of the ridge toner removing device 9. Structures other than the above are the same as those shown in FIG. 1. The same parts and portions as those in FIG. 1 bear the same reference numbers. The same image receiving sheet S is used. However, developer DV' used in this embodiment is one-component developer formed of negatively chargeable magnetic toner.

Similarly to the developing device 4, the developing device 4" has a magnet roller Mg3 having magnetic poles, and a developing roller 41" fitted around the magnet roller Mg3. In the developing operation, a drive device (not shown) drives the developing roller 41" to rotate clockwise in the figure. The developing roller 41" is supplied with the DC developing bias of, e.g., −200 V from a power source PW41. The developing device 4" develops the electrostatic latent image on the photosensitive member 1 by means of a magnetic brush of the magnetic toner formed on the surface of the developing roller 41".

The toner separating device 8" has a magnet roller Mg4 having magnetic poles, and a roller 401" fitted around the magnet roller Mg4. The lower side of the roller 401" is surrounded by a casing 40", in which the developer DV' is accommodated in advance.

The toner separating device 8" includes a charger 81" located above the roller 401" with the image receiving sheet transporting path therebetween.

The toner separating device 8" also includes toner separating portion 80 utilizing a mechanical force and an air suction force.

A transporting screw 402 is arranged in a lower end of the casing 40". The screw 402 and the toner transporting pipe 403 which extends therefrom to the developing device 4" form the toner returning device 400.

The toner separating portion 80 is opposed to the transporting path of the sheet S as shown in FIG. 4(B), and includes a blade BL and an air suction head VT. The blade BL can come into contact with the ridges P of the moving sheet S so that the bending of the ridges, which occur in accordance with the movement of the sheet, and the subsequent elastic restoring thereof cause vibrations of the sheet S. The air suction head VT is disposed near the blade BL. The blade BL and the head VT extend across the moving direction of the sheet S, and cover an area corresponding to the sheet width. The head VT is connected to a vacuum suction device PM connected via a piping to the developing device 4" for leading the toner to the developing device 4".

The angle, position and others of the blade BL with respect to the sheet moving direction are appropriately determined for allowing contact with the ridges P and causing intended vibrations of the sheet S.

For separating and removing the toner from the image receiving sheet S passing through the toner separating device 8", the drive device (not shown) drives the roller 401" to rotate clockwise in the figure. The roller 401" is supplied with the DC bias of, e.g., −200 V from a power source PW40. Further, the charger 81" is supplied with a DC voltage of, e.g., −1000 V and an AC voltage in a superimposed fashion for separation and removal of the toner from the power source PW8".

In this toner separating device 8", the toner on the image receiving sheet S moves toward the developing roller 401" owing to the magnetic force and the electrostatic force as well as a slight mechanical scrubbing force applied by the magnetic brush spikes, similarly to the toner separating device 8 shown in FIG. 1. Thereby, the toner is separated and removed from the sheet S.

The toner thus separated and removed is returned to the developing device 4" by the toner returning device 400 for reuse.

Subsequently to the toner separation by the magnetic rush on the developing roller 401", the toner separating portion 80 separates and removes the toner. The toner separating portion 80 vibrates the sheet S by the blade BL which comes into contact with the ridges P of the sheet S. This vibrations drop the toner from the sheet S, or promote the dropping of the toner so that the air suction head VT can takes in the toner. The toner thus taken will be reused in the developing device 4".

The toner separating portion 80 may be disposed upstream to the roller 401" instead of the position shown in FIG. 4. The toner separating portions 80 may be disposed in the position shown in FIG. 4 and in a position upstream to the roller 401", respectively.

In the structure provided with the toner separating device, the toner separating portion 80 may be eliminated. Conversely, the toner separating and removing means formed of the magnetic brush may be eliminated.

The toner image will be formed on the image receiving sheet already subjected to the toner removing processing in the same manner as that of the image forming apparatus shown in FIG. 1 except for that the developing device 4" is used instead of the developing device 4.

The ridge toner removing device 9' includes a brush roller 94 which can scrub the top portions of the ridges of the irregular surface of the image receiving sheet. A drive device (not shown) drives the brush roller 94 to rotate counterclockwise in the figure so that the brush roller 94 can remove the toner from the top portions of the ridges of the image receiving sheet, and can also remove the developer remaining on the surface of the photosensitive member 1. The surface of the photosensitive member 1 is also cleaned up by the blade 6.

The brush roller 94 and the blade 6 are surrounded by a casing 95, and the transporting screw 61 is arranged in a lower end of the casing 95. The screw 61 and the toner transporting pipe 62 which extends therefrom to the developing device 4" form the toner returning device 60.

Distinctive structures of the toner separating devices in the respective image forming apparatuses, which are already described with reference to FIGS. 1, 3 and 4, can be appropriately selected and employed in combination.

Figure 5A:
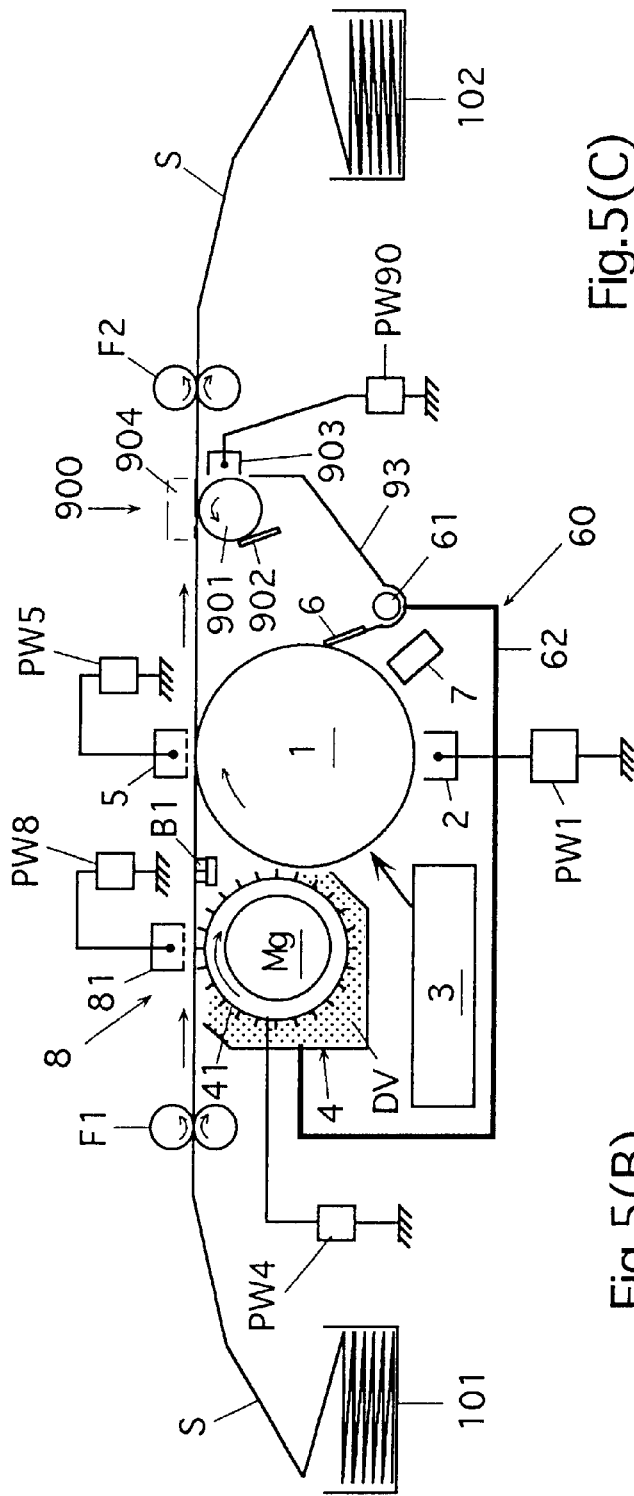
FIG. 5(A) shows a schematic structure of further another example of the image forming apparatus for implementing the non-fixing image forming method and the image formation material reusing method according to the invention.
Figure 5B:
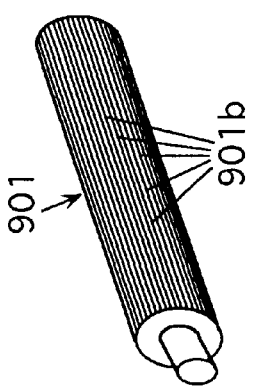
FIG. 5(B) is a perspective view of a ridge cleaning roller shown in FIG. 5(A)
Figure 5C:
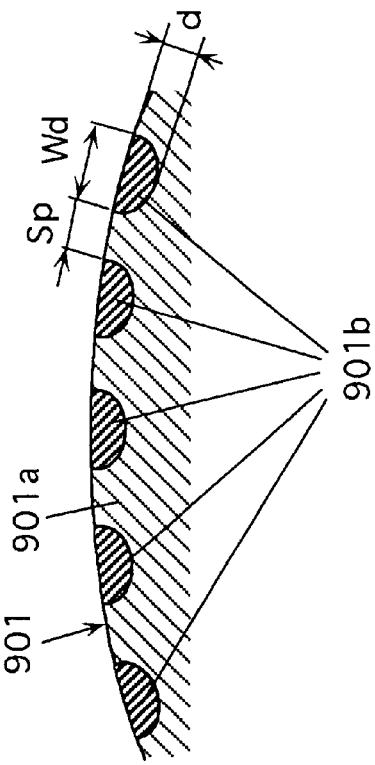
FIG. 5(C) is a fragmentary cross section of the ridge cleaning roller.

Referring to FIGS. 5(A), 5(B) and 5(C), description will now be given on further another example of the image forming apparatus, which can be used for implementing the non-fixing image forming method and the image formation material reusing method according to the invention.

The image forming apparatus shown in FIG. 5(A) differs from the image forming apparatus shown in FIG. 1 in that a ridge toner removing device 900 is employed instead of the ridge toner removing device 9. Structures other than the above are the same as those shown in FIG. 1. The developer DV and the image receiving sheet S are the same as those already described.

The ridge toner removing device 900 includes a ridge cleaning roller 901 disposed near and under the image receiving sheet transporting path, a charging device 903 for charging the roller 901 and a blade 902 for scraping off the toner and others on the roller 901. The blade 902 for scraping off the toner and others may be replaced with another toner removing means such as a brush roller. The charging device 903 in this embodiment is a corona charger.

As shown in FIGS. 5(B) and 5(C), the ridge cleaning roller 901 has a surface layer 901a. At least the surface layer 901a is made of an electrically conductive material. A large number of stripe-like grooves which are parallel and close to each other are formed on the surface layer 901a. Each stripe-like groove has a width Wd of about 10 $\mu$m–20 $\mu$m, a depth d of about 5 $\mu$m to 20 $\mu$m and is spaced from the neighboring groove by a distance Sp of about 2 $\mu$m–20 $\mu$m. These grooves are filled with electrically insulating resin selected from a group including acrylic resin, polyester resin, epoxy resin or the like so that the roller entirely has a smooth surface.

Insulating resin portions 901b which are dispersed in stripe-like forms on the ridge cleaning roller are used as local electrostatic field forming portions in a fine pattern.

For removing the toner from the top portions of the ridges of the image receiving sheet, the charger 903 is supplied with the DC voltage of, e.g., +6000 V of the polarity opposite to the chargeable polarity of the toner on the ridge from a power source PW90. Thereby, the dispersed local electrostatic field forming portions 901b formed in the fine pattern on the surface of the ridge cleaning roller 901 are uniformly charged. Thereby, the portions 901b produce the local electrostatic fields, which do not attract the toner in the concavities of the irregular surface of the image receiving sheet, but can attract the toner on the top portions of the ridges of the image receiving sheet onto the roller 901.

The blade 6 in contact with the photosensitive member 1 as well as the foregoing roller 901 and the blade 902 are surrounded by the casing 93. The transporting screw 61 is arranged in a lower end of the casing 93. The screw 61 and the toner transporting pipe 62 which extends therefrom to the developing device 4 form the toner returning device 60 for returning the developer to the developing device 4.

In the image forming apparatus described above, the operations of separating the toner from the sheet S and subsequently forming the toner image are performed in a manner similar to that of the image forming apparatus shown in FIG. 1.

The image receiving sheet S carrying the toner image reaches the ridge toner removing device 900. The cleaning roller 901 of the device 900 is drive to rotate in a position close to the image receiving sheet S, and the charging device 903 forms the dispersed local electrostatic fields in a fine pattern on the roller surface for attracting the toner on the ridges. Thereby, the toner on the ridges is attracted onto the local electrostatic field forming portions 901b of the ridge cleaning roller 901, and thereby is removed from the ridges.

The toner which is removed in this manner is scraped off by the blade 902 in contact with the roller 901, and is returned by the returning device 60 to the developing device 4 for reuse.

The image receiving sheet S, on which the toner image is formed and is already subjected to the processing of removing the toner from the ridges, is sent by the feed roller pair F2 to the discharge tray 102.

For moving the image receiving sheet S more reliably to the position close to the ridge cleaning roller 901, an image receiving sheet pushing member 904 may be opposed to the roller 901.

Figure 6A:
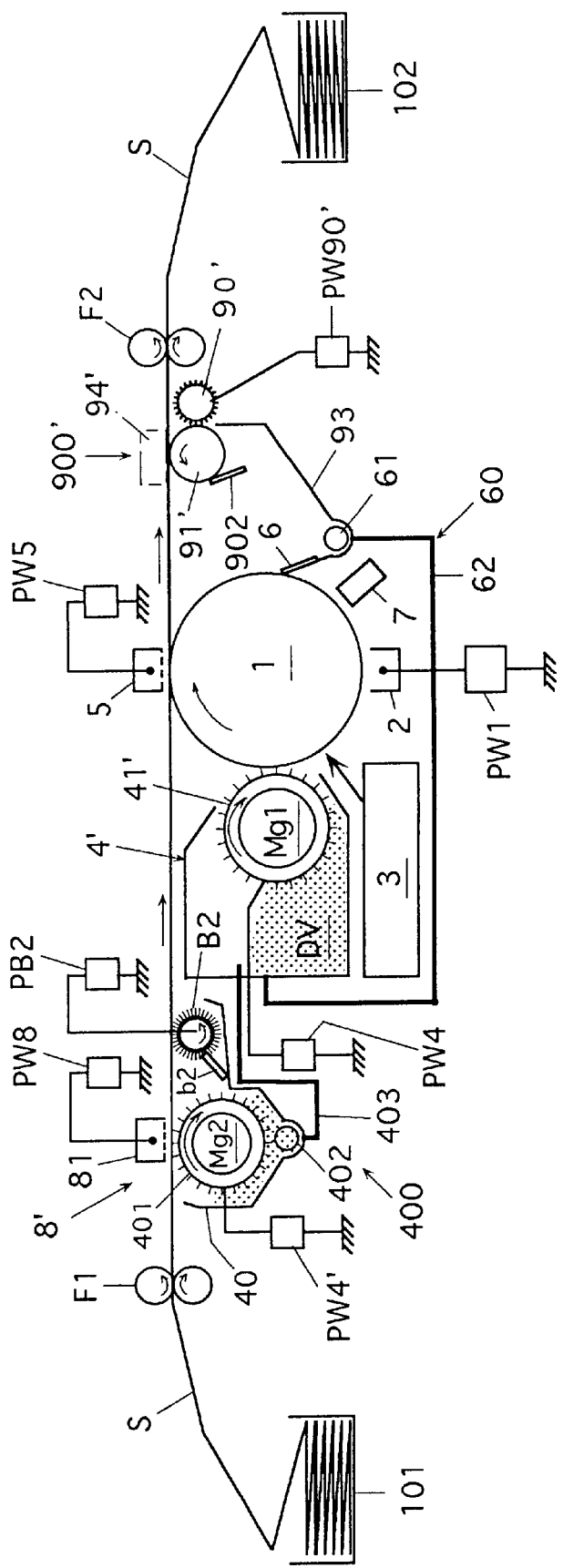
FIG. 6(A) shows a schematic structure of further another example of the image forming apparatus for implementing the non-fixing image forming method and the image formation material reusing method according to the invention.
Figure 6B:
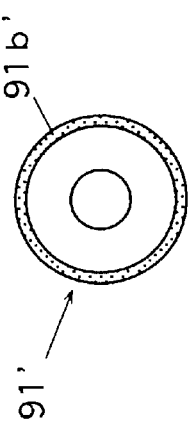
FIG. 6(B) is a cross section of the ridge cleaning roller shown in FIG. 6(A)

Referring to FIGS. 6(A) and 6(B), description will now be given on further another example of the image forming apparatus, which can be used for implementing the non-fixing image forming method and the image formation material reusing method according to the invention.

The image forming apparatus shown in FIG. 6(A) differs from the image forming apparatus shown in FIG. 3 in that a ridge toner removing device 900' is employed instead of the ridge toner removing device 9. Structures other than the above are the same as those shown in FIG. 3. The developer DV and the image receiving sheet S are the same as those already described. The same parts and portions as those in FIG. 3 bear the same reference numbers.

The ridge toner removing device 900' includes a ridge cleaning roller 91' disposed near and under the image receiving sheet transporting path, a charging roller 90' for charging the roller 91' and the blade 902 for scraping off the toner and others on the roller 91'. The blade 902 for scraping off the toner and others may be replaced with another toner removing means such as a brush roller.

As shown in FIG. 6(B), the ridge cleaning roller 91' has a coated surface layer 91*b'*, which is made of electrically insulating resin selected from a group including acrylic resin, polyester resin, epoxy resin or the like, and has a thickness of about 5 $\mu$m–20 $\mu$m.

The charging roller 90' has a large number of irregularities on its surface. For removing the toner from the top portions of the ridges of the image receiving sheet, the charging roller 90' is supplied with a the DC voltage of, e.g., 800 V of the polarity opposite to the chargeable polarity of the toner on the ridge from a power source PW90'. Thereby, the coating surface layer 91*b'* of the ridge cleaning roller 91' produces and disperses the local electrostatic fields in a fine pattern. The local electrostatic fields thus produced do not attract the toner in the concavities of the irregular surface of the image receiving sheet, but can attract the toner on the top portions of the ridges of the image receiving sheet onto the roller 91'.

These local electrostatic fields in the fine pattern take on the stripe-like forms, which are parallel and close to each other. Each of the local electrostatic fields has a width of about 10 $\mu$m–20 $\mu$m, and is spaced by a distance of 2 $\mu$m–20 $\mu$m from the neighboring field.

The toner is separated and removed in a manner similar to that of the image forming apparatus shown in FIG. 3, and then the image receiving sheet S bearing the toner image reaches the ridge toner removing device 900', which removes the toner from the ridges. The ridge cleaning roller 91' of the device 900' is rotated at the vicinity of the image receiving sheet S, and the dispersed local electrostatic fields in the fine pattern for attracting the toner on the ridges are formed on the surface of the charging roller 91'. In this manner, the toner on the ridges is attracted and removed by the ridge cleaning roller 91'.

The toner thus removed is scraped off by the blade 902 in contact with the roller 91', and is returned by the returning device 60 to the developing device 4 for reuse.

The image receiving sheet S, on which the toner image is formed and is subjected to the processing of removing the toner from the ridges, is sent by the feed roller pair F2 to the discharge tray 102.

For moving the image receiving sheet S more reliably to the position close to the ridge cleaning roller 91', an image receiving sheet pushing member 94' may be opposed to the roller 91'.

Figure 7A:
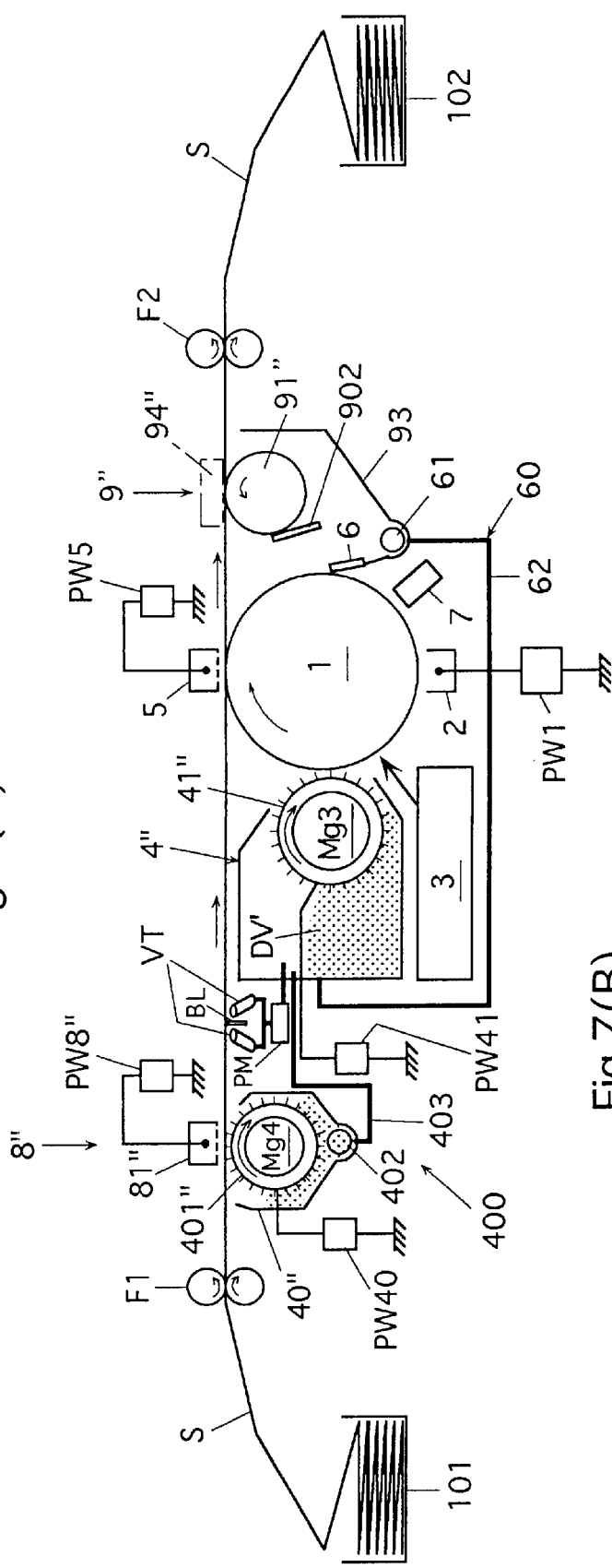
FIG. 7(A) shows a schematic structure of further another example of the image forming apparatus for implementing the non-fixing image forming method and the image formation material reusing method according to the invention.
Figure 7B:
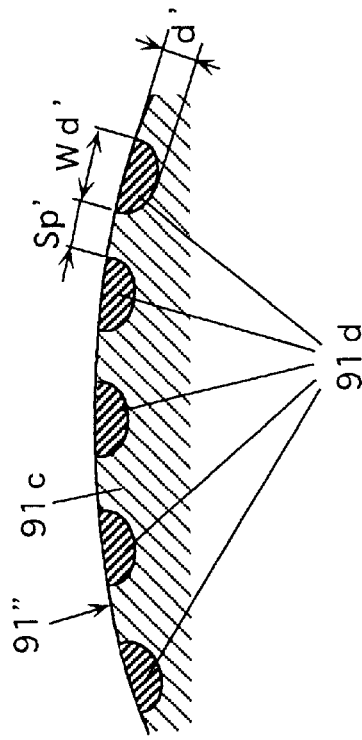
FIG. 7(B) is a fragmentary cross section of the ridge cleaning roller shown in FIG. 7(A)

Referring to FIGS. 7(A) and 7(B), description will now be given on further another example of the image forming apparatus, which can be used for implementing the non-fixing image forming method according to the invention.

The image forming apparatus shown in FIG. 7(A) differs from the image forming apparatus shown in FIG. 4 in that a ridge toner removing device 9" is employed instead of the ridge toner removing device 9'. Structures other than the above are the same as those shown in FIG. 4. The same parts and portions as those in FIG. 4 bear the same reference numbers. The same image receiving sheet S is used. However, developer DV' used in this embodiment is one-component developer formed of negatively chargeable magnetic toner.

The ridge toner removing device 9" includes a ridge cleaning roller 91" disposed near and under the image receiving sheet transporting path, and the blade 902 for scraping off the toner and others on the roller 91".

The ridge cleaning roller 91" has a roller surface portion 91*c* as shown in FIG. 7(B), which is made of a non-magnetic material, and is provided with dispersed concavities neighboring to each other. Each concavity forms a groove, and therefore has the form of a stripe. These concavities are filled with a ferromagnetic material.

A portion 91*d* formed of the magnetized ferromagnetic material has a width Wd' of about 2 $\mu$m–20 $\mu$m and a depth d' of about 5 $\mu$m–20 $\mu$m, and is spaced from the neighboring portion 91*d* by a distance of Sp' of about 2 $\mu$m–20 $\mu$m. The portions 91*d* take the form of parallel stripes which are dispersed but are close to each other, as a whole. Thereby, the portions 91*d* provide the local magnetostatic fields in the fine pattern, which can attract the magnetic toner adhered to the top portions of the ridges of the image receiving sheet.

The blade 6 in contact with the photosensitive member 1 as well as the ridge cleaning roller 91" and the blade 902 are surrounded by the casing 93. The transporting screw 61 is arranged in a lower end of the casing 93. The screw 61 and the toner transporting pipe 62 which extends therefrom to the developing device 4" form the toner returning device 60 for returning the developer to the developing device 4".

The toner is separated and removed in a manner similar to that of the image forming apparatus shown in FIG. 4, and then the image receiving sheet S carrying the toner image reaches the ridge toner removing device 9", which removes the toner from the ridges. The ridge cleaning roller 91" of the device 9" is rotated at the vicinity of the image receiving sheet S so that the toner on the top portions of the ridges is attracted and removed by a magnetic force to the ridge cleaning roller 91'.

The toner thus removed is scraped off by the blade 902 in contact with the roller 91", and is returned by the returning device 60 to the developing device 4" for reuse.

The image receiving sheet S, on which the toner image is formed and is subjected to the processing of removing the toner from the ridges, is sent by the feed roller pair F2 to the discharge tray 102.

For moving the image receiving sheet S more reliably to the position close to the ridge cleaning roller 91', an image receiving sheet pushing member 94" may be opposed to the cleaning roller 91".

The image receiving sheet S, which is produced in the non-fixing image forming method by the image forming apparatus described above, has the image formation surface in the exposed state. Although the sheet can be used as it is, the image forming surface may be covered with a protective sheet. The protective sheet is arranged in a separatable fashion. Thereby, the toner can be separated and removed later after peeling off the protective sheet so that at least one of the protective sheet, toner and image receiving sheet can be reused.

Figure 14A:
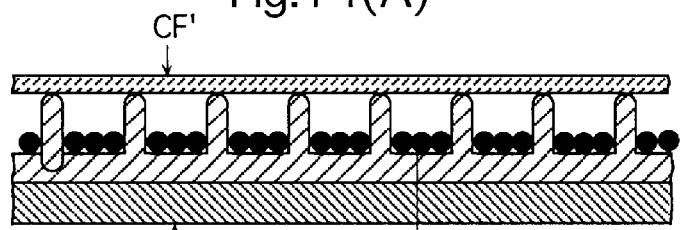
FIG. 14(A) is a cross section of the image receiving sheet having an image formation surface covered with a transparent protective sheet.
Figure 14B:
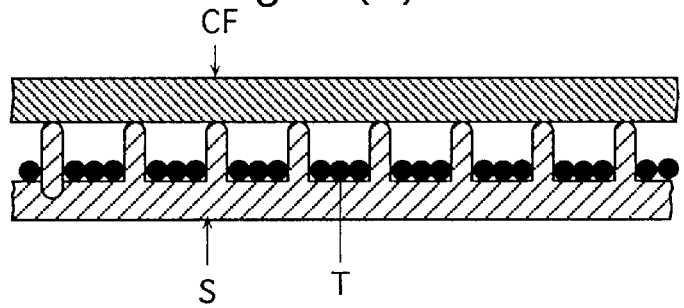
FIG. 14(B) is a cross section of the image receiving sheet having the image formation surface covered with an opaque protective sheet.

FIG. 14(A) shows an example in which a transparent protective sheet CF' covers in a peelable fashion the image forming surface of the opaque image receiving sheet S carrying the toner image. The image can be viewed through the transparent protective sheet CF'. FIG. 14(B) shows an example in which an opaque protective sheet CF (white protective sheet in this embodiment) covers in a peelable fashion the image forming surface of the transparent image receiving sheet S carrying the toner image. The image can be viewed through the rear surface of the transparent image receiving sheet S.

Figure 14C:
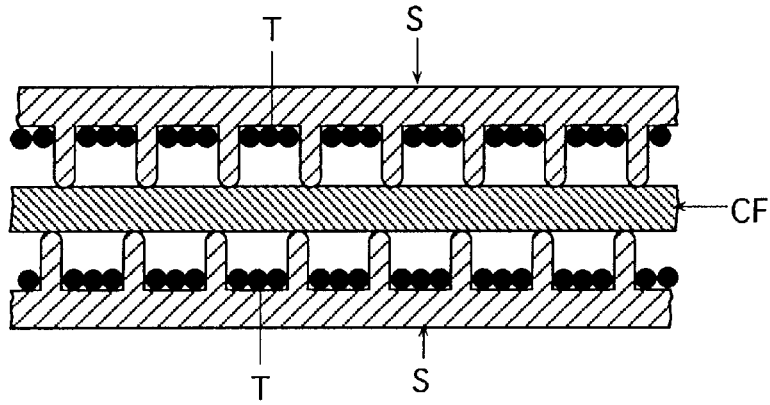
FIG. 14(C) is a cross section of the image receiving sheets having the image formation surfaces opposed together and covered with a common protective sheet.

FIG. 14(C) shows an example in which two image receiving sheets S each carrying the toner image are arranged with their image forming surfaces opposed to each other, and the opaque protective sheet CF (white protective sheet in this embodiment) is interposed between the image forming surfaces. The image can be viewed through the rear surface of each transparent image receiving sheet S.

In any one of the above cases, each of the protective sheets CF and CF' can be laid in a peelable fashion over the image forming surface of the image receiving sheet, e.g., by an electrostatic attracting force. For example, edges of the protective sheet and the edges of the image receiving sheet may be adhered together in a peelable fashion by pressure-sensitive adhesive or the like.

Referring to FIGS. 8–11, description will be given on examples of the protective sheet peeling device for peeling and removing the protective sheet from the image receiving sheet as well as the protective sheet covering device applying the protective sheet over the image receiving sheet carrying the toner image.

Figure 8:
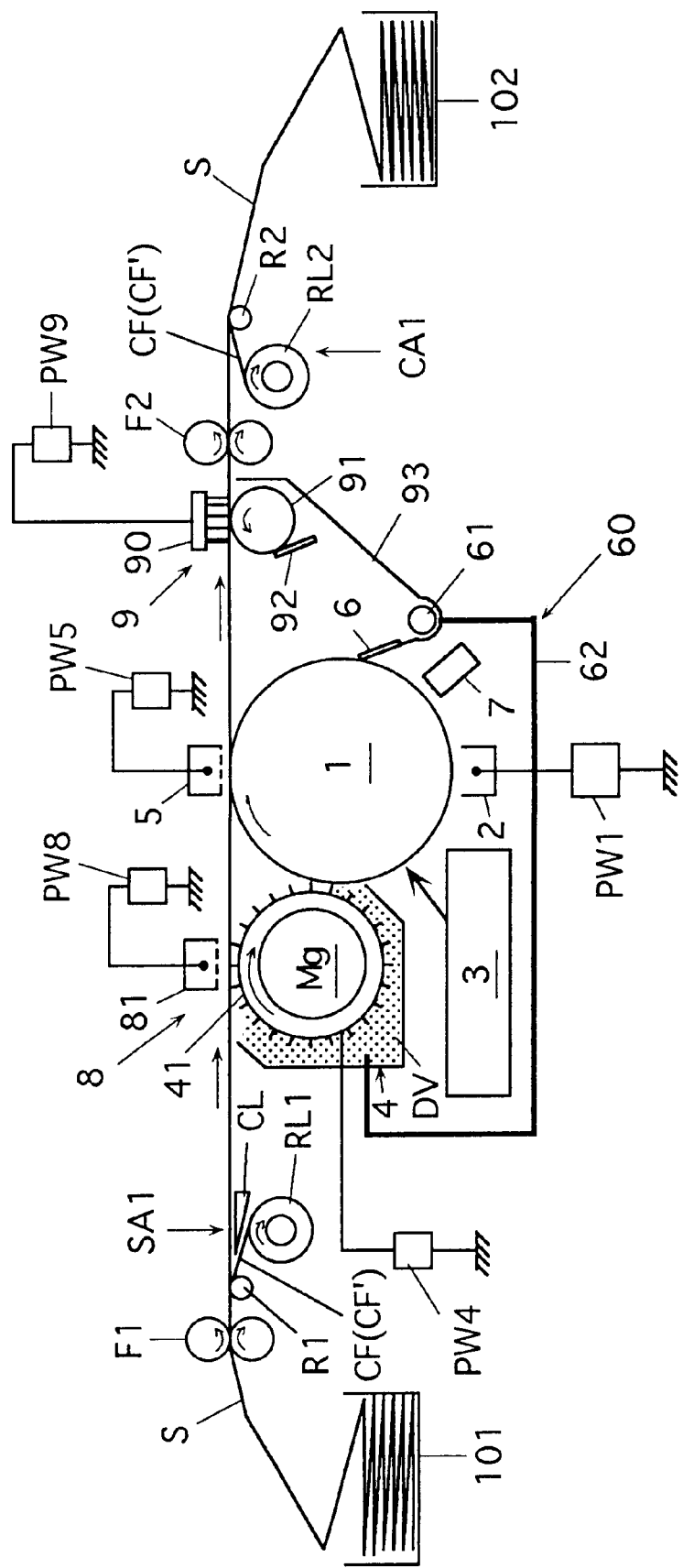
FIG. 8 shows a schematic structure of further another example of the image forming apparatus for implementing the non-fixing image forming method and the image formation material reusing method according to the invention.

The image forming apparatus shown in FIG. 8 differs from the image forming apparatus shown in FIG. 1 in that the toner separating device 8 is not provided with the brush B1 for toner separation, and a protective sheet peeling device SA1 and a protective sheet covering device CA1 are employed. The device SA1 is disposed downstream from the sheet feed roller pair F1 and upstream to the toner separating device 8. The device CA1 is disposed closely to and downstream from the sheet feed roller pair F2. Structures other than the above are the same as those of the image forming apparatus shown in FIG. 1. The same parts and portions bear the same reference numbers.

This apparatus is used for the image receiving sheet S of the continuous type, which has the image forming surface covered with the opaque protective sheet CF or transparent protective sheet CF'. The protective sheet peeling device SA1 peels off the protective sheet CF (CF') from the image receiving sheet S, and the toner separating device 8 separates and removes the toner. Thereafter, the toner image formed on the photosensitive member 1 is transferred onto the image receiving sheet, and the ridge toner removing device 9 removes the toner adhered to the ridges of the sheet. Subsequently, the protective sheet covering device CA1 covers the image forming surface of the sheet S with the protective sheet CF (CF'), and then the sheet S is discharged to the discharge tray 102.

The protective sheet peeling device SA1 includes a protective sheet guide roller R1 opposed to the transporting path of the sheet S, a reel RL1 for winding up the protective sheet, and a separating claw CL located downstream from the guide roller R1. The image receiving sheet S which is continuously supplied from the sheet supply portion 101 is first processed to peel off the protective sheet CF (CF'), and connect it to the reel RL1. Then, in accordance with the transportation of the sheet S, the protective sheet is wound up around the reel RL1, which is driven to rotate, while being guided by the separation claw CL. In this manner, the protective sheet is peeled off.

The protective sheet covering device CA1 includes a guide roller R2 opposed to the transporting path of the sheet S, and a reel RL2 for continuously supplying the protective sheet CF (CF'). The protective sheet CF (CF') is first pulled out from the reel RL2, and is brought into contact with the leading end of the sheet sent to the guide roll R2. The protective sheet CF (CF') thus supplied is sent into a position between the sheet S and the guide roller R2. Thereafter, protective sheet CF (CF') is pulled out from the reel RL2 in accordance with continuous feeding of the sheet S carrying the image so that the protective sheet CF (CF') is applied and thus covers the image forming surface.

Figure 14D:
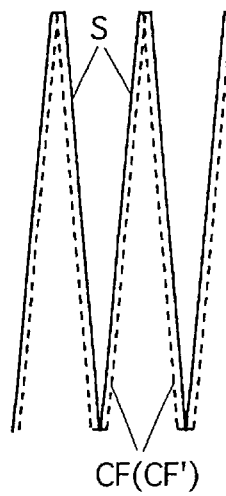
FIG. 14(D) is a side view showing a foldable continuous image receiving sheet covered with the protective sheet.

The sheet S thus covered with the protective sheet CF (CF') is folded, e.g., as shown in FIG. 14(D), and the image can be viewed by keeping the sheet S in a book-like form having the upper or lower ends gathered together.

Figure 9:
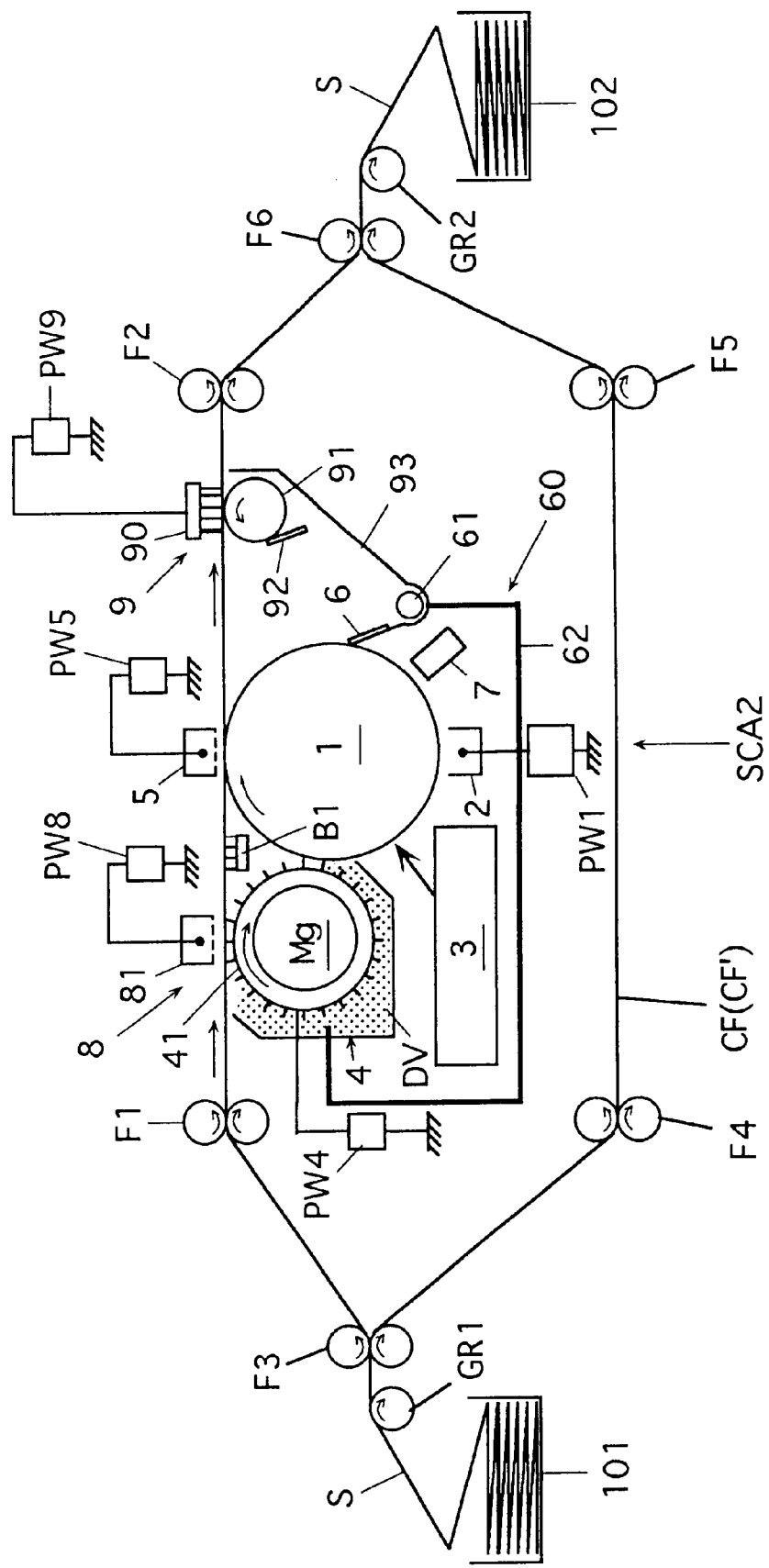
FIG. 9 shows a schematic structure of further another example of the image forming apparatus for implementing the non-fixing image forming method and the image formation material reusing method according to the invention.

The image forming apparatus shown in FIG. 9 differs from the image forming apparatus shown in FIG. 1 in that a device SCA2 serving as both the protective sheet peeling device and the protective sheet covering device is employed. The same parts and portions bear the same reference numbers.

This apparatus is used for the image receiving sheet S of the continuous type, which has the image forming surface covered with the opaque protective sheet CF or transparent protective sheet CF'. The protective sheet peeling and covering device SCA2 peels off the protective sheet CF (CF') from the image receiving sheet S, and the toner separating device 8 separates and removes the toner. Thereafter, the toner image formed on the photosensitive member 1 is transferred onto the image receiving sheet, and the ridge toner removing device 9 removes the toner adhered to the ridges of the sheet. Subsequently, the device SCA2 covers the image forming surface of the sheet S with the same protective sheet CF (CF') as the sheet, which was peeled off before image formation, and then the sheet S is discharged to the discharge tray 102.

The protective sheet peeling and covering device SCA2 includes a guide roller GR1 located above the sheet supply portion 102, a sheet feed and protective sheet peeling roller pair F3 located close to and downstream from the guide roller GR1, protective sheet feed roller pairs F4 and F5, a guide roller GR2 above the sheet discharge tray 102, and a sheet feed and protective sheet applying roller pair F6 located close to and upstream to the guide roller GR2.

The image receiving sheet S is continuously supplied from the sheet supply portion 101, and is guided by the guide roller GR1 through the roller pair F3. The sheet S thus sent through the roller pair F3 is processed to peel off the protective sheet CF (CF'). Then, the sheet S guided by the sheet feed roller pair F1 passes through processing portions for the toner separation, image formation and toner removal from the ridges. Then, the sheet S is sent from the roller pair F2 to the roller pair F6. The separated protective sheet CF (CF') is sent through the roller pairs F4 and F5 to the roller pair F6, and is supplied into the roller pair F6 together with the sheet S overlaid together. Thus, the protective sheet CF (CF') is peeled off from the sheet S which is continuously supplied from the sheet supply device 101. At the same time, the sheet S is sent to the roller pair F6 through the portions for the toner separation, image formation and removal of toner form the ridges. The sheet S on which the image is formed is discharged to the discharge tray 102 after its image forming surface is coated with the protective sheet CF (CF').

Figure 10:
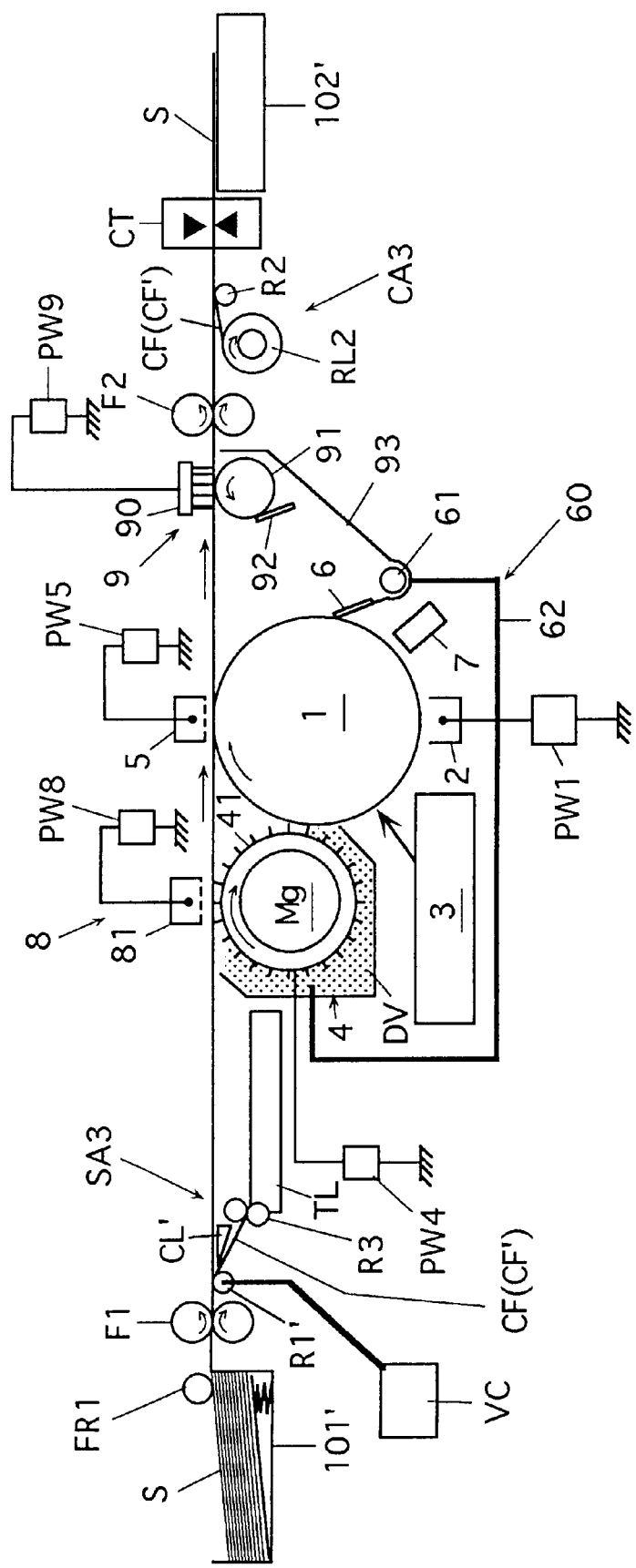
FIG. 10 shows a schematic structure of further another example of the image forming apparatus for implementing the non-fixing image forming method and the image formation material reusing method according to the invention.

The image forming apparatus shown in FIG. 10 differs from the image forming apparatus shown in FIG. 1 in that the toner separating device 8 is not provided with the brush B1 for toner separation, and a protective sheet peeling device SA3, a protective sheet covering device CA3 and a cutter CT are employed. The device SA3 is located downstream from the sheet feed roller pair F1 and upstream to the toner separating device 8. The device CA3 and the cutter CT are successively disposed, and are located in positions close to and downstream from the sheet feed roller pair F2. A sheet supply tray 101' is employed instead of the sheet supply portion 101 in the image forming apparatus shown in FIG. 1, and a sheet discharge tray 102' is employed instead of the sheet discharge tray 102. Structures other than the above are the same as those of the image forming apparatus shown in FIG. 1. The same parts and portions bear the same reference numbers.

This apparatus is used for the image receiving sheets S of the cut-sheet type, in which the images are already formed, and the image forming surfaces are coated with the opaque protective sheet CF or transparent protective sheet CF'. The protective sheet peeling device SA3 peels off the protective sheet CF (CF') from the image receiving sheet S, and the toner separating device 8 separates and removes the toner. Thereafter, the toner image formed on the photosensitive member 1 is transferred onto the image receiving sheet, and the ridge toner removing device 9 removes the toner adhered to the ridges of the sheet. Subsequently, the protective sheet covering device CA3 covers the image forming surface of the sheet S with the protective sheet CF (CF') in the continuous form. After cutting the protective sheet by the cutter CT, the sheet S is discharged to the discharge tray 102'.

The protective sheet peeling device SA3 includes a protective sheet suction roller R1' opposed to the sheet transporting path, a separating claw CL' downstream from the roller R1' and a protective sheet accommodating tray TL. The suction roller R1' is a hollow roller having many air suction apertures, and is connected via a rotary joint to a vacuum suction device vc.

The protective sheet covering device CA3 has the same structure as the protective sheet covering device CA1 in the image forming apparatus shown in FIG. 8, and includes the reel RL2 for paying off the protective sheet CF (CF') and the guide roller R2.

A sheet supply roller FR1 supplies the sheets S one by one from the sheet supply portion 101'. The roller R1' performs the air suction in accordance with the same timing as the arrival of the leading ends of the sheets, and thereby peels of the protective sheet CF (CF') from each sheet S. The protective sheet thus peeled is guided by the separation claw CL', and is supplied into the accommodating tray TL by a take-in roller pair R3. The sheet S from which the protective sheet is peeled off is sent by the roller pair F2 after passing through the respective steps of toner separation and removal, image formation and toner removal from the ridges.

The protective sheet covering device CA3 applies and covers the protective sheet CF (CF') to the sheet S thus sent after the image formation. After the covering, the protective sheet CF (CF') is cut by the cutter CT into the size corresponding to that of the single sheet S. The sheets S thus covered with the protective sheets are discharged to the tray 102'.

Figure 11:
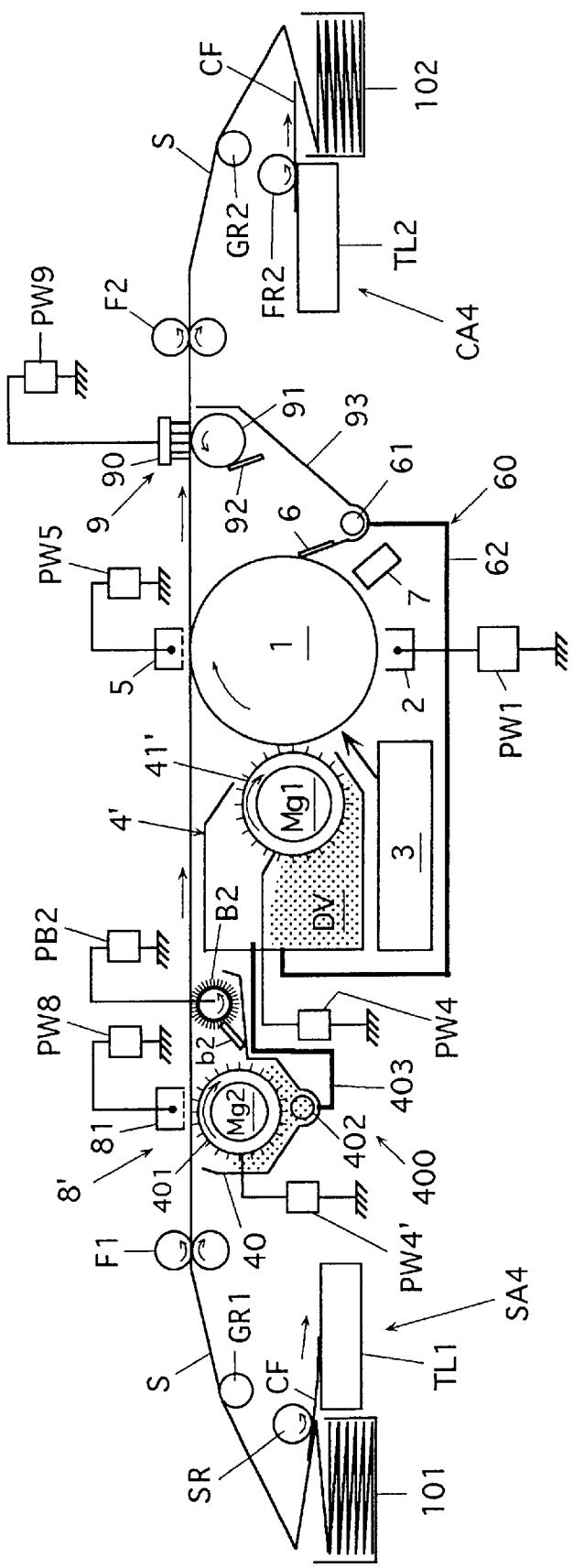
FIG. 11 shows a schematic structure of further another example of the image forming apparatus for implementing the non-fixing image forming method and the image formation material reusing method according to the invention.

The image forming apparatus shown in FIG. 11 differs from the image forming apparatus shown in FIG. 3 in that a protective sheet peeling device SA4 and a protective sheet covering device CA4 are employed. The device SA4 is opposed to the image receiving sheet supply portion 101, and the device CA4 is opposed to the sheet discharge tray 102.

This apparatus is used for the transparent image receiving sheet S of the continuous type, in which the image forming surfaces neighboring to each other are coated with the common opaque protective sheet CF. The protective sheet peeling device SA4 peels off the protective sheet CF from the sheet S, and the toner separating device 8' separates and removes the toner. Thereafter, the toner image formed on the photosensitive member 1 is transferred onto the image receiving sheet, and the ridge toner removing device 9 removes the toner adhered to the ridges of the sheet. Subsequently, the protective sheet covering device CA4 applies the common opaque protective sheet CF to a position between the neighboring image forming surfaces, and at the same time, the sheet S is discharged to the discharge tray 102.

The protective sheet covering device SA4 includes the peeling roller SR disposed above the end of the sheet supply portion 101, and a protective sheet accommodating tray TL1 opposed to the roller SR.

The protective sheet covering device CA4 includes a tray TL2 accommodating the protective sheet CF and a supply roller FR2 for supplying the protective sheet CF from the tray TL2.

The sheet S accommodated in the sheet supply portion 101 is in the folded state, and is expanded when it is pulled out by the roller pair F1 through the guide roller GR1. When the sheet S is being expanded from the folded state, the protective sheet CF which was located between the sheet portions starts to be exposed. At this point of time, the peeling roller SR in the protective sheet peeling device SA4 comes into contact with the end of the protective sheet CF, and the protective sheet CF is pulled out in accordance with the rotation of the peeling roller SR, and is supplied to the accommodating tray TL1. After the protective sheet CF is peeled off in this manner, the sheet S is subjected to the steps of toner separation, image formation and toner removal from the ridges, and then is fed by the roller pair F2. Then, the sheet S is guided by the guide roller GR2, and is folded when it is being discharged to the discharge tray 102. In this operation, the supply roller FR2 in the protective sheet covering device CA4 rotates to pull out the protective sheet CF from the tray T12, and supplies it to the position between the portions of the sheet S which is being folded. In this manner, the sheet CF is interposed between the neighboring image forming surfaces of the sheet S, and the image forming surface is covered with the protective sheet CF.

Figure 14E:
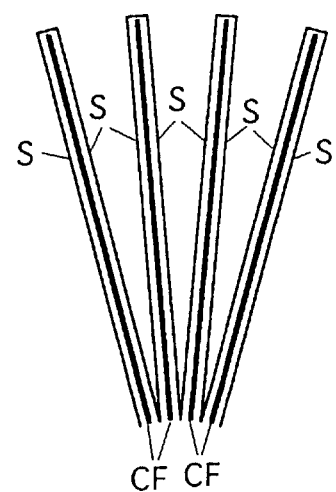
FIG. 14(E) is a side view showing the continuous transparent image receiving sheet arranged in a book-like form and having image forming surfaces neighboring to each other and covered with the opaque protective sheet.

The sheet S covered with the protective sheet CF can be folded into a book-like form, e.g., as shown in FIG. 14(E) so that images can be viewed.

All the protective sheets shown in FIGS. 8–11 are electrostatically attracted onto the sheet image formation surfaces for coating them in a peelable manner. The material and the thickness of each protective sheet are appropriately determined to allow easy electrostatic attraction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming method comprising:
   supplying to a printing device an image receiving sheet having an irregular surface provided with a large number of continuous groove-like concavities for receiving toner; and
   adhering removably a toner image corresponding to an original image to said continuous groove-like concavities of said image receiving sheet by said printing device, wherein each of said continuous groove-like concavities is continuous from one edge portion of the image receiving sheet to another edge portion of the image receiving sheet.

2. The image forming method according to claim 1, wherein
   each of said continuous groove-like concavities of said image receiving sheet has a width two or more times larger than an average particle diameter of the toner.

3. The image forming method according to claim 1, wherein
   each of said continuous groove-like concavities of said image receiving sheet has a width of 20 $\mu$m–500 $\mu$m and a depth of 20 $\mu$m–100 $\mu$m.

4. The image forming method according to claim 1, wherein
   each ridge extending along said continuous groove-like concavity of said image receiving sheet has a width of 1/50–1/2 of the width of said continuous groove-like concavity.

5. The image forming method according to claim 1, further comprising the step of:
   removing the toner adhered to the top portions of the ridges extending along said continuous groove-like concavities after removably adhering the toner image to said continuous groove-like concavities of said image receiving sheet by said printing device.

6. The image forming method according to claim 1, further comprising the step of:
   separating and removing the toner from the image receiving sheet carrying the toner image prior to said step of adhering the toner image to the image receiving sheet by said printing device.

7. The image forming method according to claim 1, wherein
   said image formation surface of said image receiving sheet is covered with a peelable protective sheet after forming the toner image on said image receiving sheet.

8. The image forming method according to claim 1, wherein
   a peelable protective sheet covering the image receiving sheet is peeled off prior to the formation of the toner image on said image receiving sheet.

9. An image forming apparatus comprising:
   a device for supplying an image receiving sheet having an irregular surface provided with a large number of continuous groove-like concavities for receiving toner, wherein each of said continuous groove-like concavities is continuous from one edge portion of the image receiving sheet to another edge portion of the image receiving sheet; and
   a printing device for removably adhering a toner image corresponding to an original image to the continuous groove-like concavities of said image receiving sheet supplied from said image receiving sheet supply device.

10. The image forming apparatus according to claim 9, wherein
    said toner is chargeable toner, and said printing device electrostatically adheres the toner image to the continuous groove-like concavities of said irregular surface of said image receiving sheet.

11. The image forming apparatus according to claim 9, wherein
    said printing device includes:
    an electrostatic latent image carrier,
    a device for forming an electrostatic latent image corresponding to original image information on said electrostatic latent image carrier,
    a developing device for developing said electrostatic latent image to form a toner image, and
    a transfer device for electrostatically transferring the toner in said toner image onto said image receiving sheet.

12. The image forming apparatus according to claim 9, further comprising:
    a ridge toner removing device disposed downstream, in the transporting direction of the image receiving sheet, from the printing device for removing the toner adhered to the top portions of the ridges of the irregular surface of said image receiving sheet carrying the toner image formed by said printing device.

13. The image forming apparatus according to claim 12, further comprising:
    a toner returning device for returning the toner separated and removed by said ridge toner removing device to said printing device for reuse.

14. The image forming apparatus according to claim 12, wherein
    said toner is chargeable toner, and said ridge toner removing device includes a charging device for charging the top portions of the ridges of said irregular surface of said image receiving sheet to have the same polarity as the chargeable polarity of said toner, and thereby removing the toner adhered to the top portions of the ridges.

15. The image forming apparatus according to claim 12, wherein
    said ridge toner removing device includes a ridge cleaning rotary member for forming local electrostatic fields and/or local magnetostatic fields dispersed in a fine pattern on its surface, said ridge cleaning rotary member being in contact with or close to the top portions of the ridges for attracting the toner adhered to the top portions of the ridges.

16. The image forming apparatus according to claim 9, further comprising:
    a protective sheet covering device disposed downstream, in the image receiving sheet transporting direction, from the printing device for covering the image formation surface of the image receiving sheet carrying said toner image with a peelable protective sheet.

17. A toner removing device comprising:

a device for supplying an image receiving sheet having an irregular surface provided with a large number of continuous groove-like concavities for receiving toner, wherein each of said continuous groove-like concavities is continuous from one edge portion of the image receiving sheet to another edge portion of the image receiving sheet; and a toner separating device for separating and removing the toner from the image receiving sheet supplied from said image receiving sheet supply device.

18. The toner removing device according to claim 17, wherein said toner separating device preforms the toner separation from said image receiving sheet by utilizing a mechanical force, an electrostatic force or a magnetic force, or by utilizing at least two of the mechanical force, the electrostatic force and the magnetic force.

19. The toner removing device according to claim 17, further comprising:

a protective sheet peeling device disposed upstream, in the image receiving sheet transporting direction, to said toner separating device for peeling off a peelable protective sheet covering the image receiving sheet supplied from said image receiving sheet supply device.

20. An image forming apparatus including:

a device for supplying an image receiving sheet having an irregular surface provided with a large number of continuous groove-like concavities for receiving toner, wherein each of said continuous groove-like concavities is continuous from one edge portion of the image receiving sheet to another edge portion of the image receiving sheet;

a toner separating device for separating and removing the toner from the image receiving sheet supplied from said image receiving sheet supply device; and a printing device for removably adhering a toner image corresponding to an original image to the continuous groove-like concavities of the image receiving sheet supplied through said toner separating device.

21. The image forming apparatus according to claim 20, further comprising:

a toner returning device for returning the toner separated and removed from the image receiving sheet by said toner separating device to said printing device for reuse.

22. The image forming apparatus according to claim 20, further comprising:

a ridge toner removing device disposed downstream, in the transporting direction of the image receiving sheet, from the printing device for removing the toner adhered to top portions of ridges of the irregular surface of said image receiving sheet carrying the toner image formed by said printing device, said ridges extending along said continuous groove-like concavities.

23. The image forming apparatus according to claim 22, further comprising:

a toner returning device for returning the toner separated and removed by said ridge toner removing device to said printing device for reuse.

24. The toner removing device according to claim 20, further comprising:

a protective sheet peeling device disposed upstream, in the image receiving sheet transporting direction, to said toner separating device for peeling off a peelable protective sheet covering the image receiving sheet supplied from said image receiving sheet supply device; and a protective sheet covering device disposed downstream, in the image receiving sheet transporting direction, from the printing device for covering an image formation surface of the image receiving sheet carrying said toner image with a peelable protective sheet.

25. An image receiving sheet for forming a toner image by removably adhering toner, comprising:

an irregular surface provided with a large number of continuous groove-like concavities for receiving said toner, wherein each continuous groove-like concavity is continuous from one edge portion of the image receiving sheet to another edge portion of the image receiving sheet and the toner image can be formed by removably adhering said toner to said continuous groove-like concavities, and ridges extending along said continuous groove-like concavities can protect the toner adhered to said continuous groove-like concavities.

26. The image receiving sheet according to claim 25, wherein said continuous groove-like concavities are regularly arranged, and each has a width two or more times larger than an average particle diameter of the toner.

27. The image receiving sheet according to claim 25, wherein said continuous groove-like concavities are regularly arranged, and each has a width of 20 $\mu$m–500 $\mu$m and a depth of 20 $\mu$m–100 $\mu$m.

28. The image receiving sheet according to claim 25, wherein each of said ridges has a width of 1/50–1/2 of the width of said continuous groove-like concavity.

* * * * *